US008073662B2

(12) United States Patent  (10) Patent No.: US 8,073,662 B2
Momose et al.  (45) Date of Patent: Dec. 6, 2011

(54) DESIGN SUPPORT METHOD, DESIGN SUPPORT SYSTEM, AND DESIGN SUPPORT PROGRAM FOR HEAT CONVECTION FIELD

(75) Inventors: Kazunari Momose, Kawanishi (JP); Kaoru Ikejima, Chiyoda-ku (JP)

(73) Assignees: Osaka University, Tokyo (JP); Advanced Knowledge Laboratory Co., Ltd., Tokyo (JP)

( * ) Notice: Subject to any disclaimer, the term of this patent is extended or adjusted under 35 U.S.C. 154(b) by 388 days.

(21) Appl. No.: 12/295,894

(22) PCT Filed: Apr. 13, 2006

(86) PCT No.: PCT/JP2006/307821
§ 371 (c)(1),
(2), (4) Date: Oct. 3, 2008

(87) PCT Pub. No.: WO2007/122677
PCT Pub. Date: Nov. 1, 2007

(65) Prior Publication Data
US 2009/0276193 A1  Nov. 5, 2009

(51) Int. Cl.
*G06G 7/56* (2006.01)
*G06G 7/57* (2006.01)
*G06G 7/48* (2006.01)
*G06F 7/60* (2006.01)
*G06F 7/64* (2006.01)

(52) U.S. Cl. ............................................. 703/5; 703/2
(58) Field of Classification Search .................. 703/2, 5
See application file for complete search history.

(56) References Cited

U.S. PATENT DOCUMENTS 4,964,060 A * 10/1990 Hartsog ............................ 703/1
2007/0005191 A1 * 1/2007 Sloup et al. ................... 700/276

FOREIGN PATENT DOCUMENTS

JP  11-053422 A  2/1999

OTHER PUBLICATIONS

Abanto et al. "Airflow modelling in a computer room", 2004, Building and Environment, 39, pp. 1393-1402.*

(Continued)

*Primary Examiner* — Kamini S Shah
*Assistant Examiner* — Suzanne Lo
(74) *Attorney, Agent, or Firm* — Keating & Bennett, LLP

(57) ABSTRACT

A highly convenient design support method and design support system for a heat convection field or a mass diffusion field which significantly reduce the number of times of numerical simulation required to examine the designing parameters for achieving the design purpose. The design support method includes a forward analysis step of analyzing the heat convection field or the mass diffusion field by solving an equation of the heat convection field or the mass diffusion field based on an initially set value of a designing parameter, an inverse analysis step of analyzing a sensitivity defined by a change ratio of the design purpose to a designing parameter change by solving an adjoint equation corresponding to the design purpose based on the set design purpose, and a sensitivity display step of displaying information on the sensitivity analyzed by inverse analysis step as a graphic image on the display device.

11 Claims, 18 Drawing Sheets

OTHER PUBLICATIONS

Momose et al. "Adjoint Numerical Approach to Convection Heat Transfer Problems", Proceedings of the 4th JSME-KSME Thermal Engineering Conference, Oct. 1-6, 2000, 6 pages.*

Momose et al. "Influence of Thermal and Flow Boundary Pertubations on Convection Heat Transfer Characteristics: Numerical Analysis Based on Adjoint Formulation", 2003, Heat Transfer Asian Research, 32, 12 pages.*

Griffith, Brent. "Framework for Coupling Room Air Models to Heat Balance Model Load and Energy Calculations (RP-1222)" 2004, HVAC&R Research, 10, 30 pages.*

Lu et al. "Numerical Investication of Convection Heat Transfer in a Heated Room", 2002, Numerical Heat Transfer 42, pp. 233-251.*

Riederer, Peter. "Thermal Room Modelling Adapted to the Test of HVAC Control Systems", 2002, Thesis, 207 pages.*

Official Communication issued in International Patent Application No. PCT/JP2006/307821, mailed on Jun. 27, 2006.

Abe et al.: "Optimization of Natural Convection Field Using Adjoint Numerical Analysis," Transactions of the Japan Society of Mechanical Engineers (Series B); vol. 70; No. 691; Mar. 25, 2004, pp. 167-174.

Momose et al.: "Influence of Thermal and Flow Boundary Perturbations on Convection Heat Transfer Characteristics (Numerical Anaylsis Based on Adjoint Formulation)," Journal of the Japan Society of Mechanical Engineers (Edition B); vol. 66; No. 646; Jun. 2000, pp. 215-221.

Momose et al.: "Influence of Thermal and Flow Boundary Perturbations on Convection Heat Transfer Characteristics: Numerical Anaylsis Based on Adjoint Formulation," Heat Transfer Asian Research, 32 (1); 2003, pp. 1 -12.

Momose et al.: "Adjoint Approach to Inverse Analysis of Convection Heat Transfer," 4th International Conference on Inverse Problems in Engineering; Rio de Janeiro, Brazil; 2002, 8 pages.

Momose et al.: "Adjoint Numerical Approach to Convection Heat Transfer Problems," Proceedings of the 4th JSME-KSME Thermal Engineering Conference; Oct. 1-6, 2000, Kobe, Japan, 6 pages.

* cited by examiner

```
***** Inverse analysis results *****

Project name:C:¥cygwin¥home¥momose¥FlowAdviser¥data¥patent¥Demo2¥demo2
Inverse analysis mode:         Maximum
Number of total elements:      27683
Criteria for determination on convergence:10E       4.00
Convergence state:10E     4.01
Number of repetitions:    763
Divergence amount(Kg/s):  0.1027E-07
Calculation time(s):      76.64

Object function

Average temperature of target(°C):    27.6344
```

FIG.17A    ----- Sensitivity ----- Shows how much the target temperature rises when the temperature at the blowoff outlet is raised by 1C.

```
Face object name: window 1
  Temperature, heating, heat transfer coefficient:    0.0000E 00 0.0000E+00 -0.7973E-03
  Flow rate (x,t,z):    0.0000E-00 0.0000E+00 0.0000E-00
Face object name: window 2
  Temperature, heating, heat transfer coefficient:    0.0000E-00 0.0000E+00 -0.1049E-02
  Flow rate (x,t,z):    0.0000E-00 0.0000E+00 0.0000E-00
Face object name: rear blowoff outlet
  Temperature, heating, heat transfer coefficient:    0.2877E-01 0.0000E+00 0.0000E+00
  Flow rate (x,t,z):    0.2871E-00 0.1163E+00 0.2046E-00
Face object name: middle blowoff outlet
  Temperature, heating, heat transfer coefficient:    0.2097E-00 0.0000E+00 0.0000E+00
  Flow rate (x,t,z):    0.1893E 02 0.6723E 01 0.1656E+00
Face object name: opening (1)
  Temperature, heating, heat transfer coefficient:    -0.1425E-07 0.0000E 00 0.0000E+00
  Flow rate (x,t,z):    -0.3664E-03 -0.6991E-06 -0.1019E-02
Face object name: front blowoff outlet
  Temperature, heating, heat transfer coefficient:    0.4349E-01 0.0000E+00 0.0000E+00
  Flow rate (x,t,z):    0.5531E 00 0.3067E+00 0.3588E+00
```

```
***** Inverse analysis results *****

Project name:C:¥cygwin¥home¥momose¥FlowAdviser¥data¥patent¥Demo3¥demo3
Inverse analysis mode:         Maximum
Number of total elements:      30039
Criteria for determination on convergence:10E       -4.00
Convergence state:10E     4.02
Number of repetitions:    741
Divergence amount(Kg/s):  0.3137E-08
Calculation time(s):      69.02

---- Object function ----

Average temperature of target(°C):    28.5092
```

FIG.17B    ----- Sensitivity ----- Shows how much the target temperature rises when the temperature at the blowoff outlet is raised by 1C.

```
Face object name: window 1
  Temperature, heating, heat transfer coefficient:    0.0000E 00 0.0000E+00 -0.1253E-03
  Flow rate (x,t,z):    0.0000E 00 0.0000E+00 0.0000E 00
Face object name: window 2
  Temperature, heating, heat transfer coefficient:    0.0000E-00 0.0000E+00 -0.4819E-04
  Flow rate (x,t,z):    0.0000E-00 0.0000E+00 0.0000E-00
Face object name: rear blowoff outlet
  Temperature, heating, heat transfer coefficient:    0.4037E-01 0.0000E+00 0.0000E+00
  Flow rate (x,t,z):    0.2318E-00 -0.2112E-02 0.3345E-01
Face object name: middle blowoff outlet
  Temperature, heating, heat transfer coefficient:    0.2985E-01 0.0000E+00 0.0000E+00
  Flow rate (x,t,z):    -0.7613E-03 0.1321E-01 -0.1655E-01
Face object name: opening (1)
  Temperature, heating, heat transfer coefficient:    -0.5253E-09 0.0000E 00 0.0000E+00
  Flow rate (x,t,z):    -0.5647E-04 -0.4223E-06 -0.7447E-04
Face object name: front blowoff outlet
  Temperature, heating, heat transfer coefficient:    0.2900E-01 0.0000E+00 0.0000E+00
  Flow rate (x,t,z):    0.1356E-01 -0.1777E-01 0.3782E-01
```

DESIGN SUPPORT METHOD, DESIGN SUPPORT SYSTEM, AND DESIGN SUPPORT PROGRAM FOR HEAT CONVECTION FIELD

BACKGROUND OF THE INVENTION

1. Field of the Invention

The present invention relates to a design support method, a design support system, and a design support program for supporting the design of a heat convection field or a mass diffusion field.

2. Description of the Related Art

Design of a heat convection field or a mass diffusion field is required in various sites or uses such as, for example, design of an indoor environment using an air conditioning apparatus, thermal design of electronic devices, and management of exhaust gas concentration in plants.

Along with the recent increase in the operation speed of computers, numerical simulations of a heat convection field or a mass diffusion field have been put into practice, and some general purpose heat and fluid flow analysis software and the like have already become commercially available and are used as designing tools. However, such software is generally used to simply obtain a solution to appropriate parameters given by a designer. For the purpose of optimization, such designing parameters are now repeatedly modified in a trial-and-error manner based on the experience of designers. Namely, the solution obtained by a numerical simulation performed once is merely a specific solution to a specific boundary condition (an initial value of a designing parameter). When the boundary condition is changed, the numerical simulation needs to be performed again.

In the meantime, an inverse problem approach which combines a numerical simulation and mathematical programming to realize automatic optimization is recently a target of attention. Various methods of optimization have been attempted. Such optimization methods are roughly classified into gradient-based optimization methods using numerical derivatives obtained by a finite difference method, and global optimization methods using genetic algorithms or the like. With each group of methods, the required number of times of numerical simulation rapidly increases as the number of designing parameters increases. Therefore, in the case where the number of designing variables is large or infinite (distribution amount), it is difficult to realize optimization within a reasonable amount of time.

Such a conventional technique of giving a boundary condition and then obtaining the temperature or the like at a target position (hereinafter, referred to as the "forward problem approach") is not practical because the numerical simulation needs to be performed too many times until the design purpose is achieved. For these reasons, there have been no general-purpose design support systems which are easily usable at the site of design.

A technique of analyzing the influence, of a change in the temperature or the like as a boundary condition, exerted on a minute temperature change or the like of the target position to find a desirable boundary condition (hereinafter, referred to as the "inverse problem approach") has been proposed (see, for example, non-patent documents Kazunari MOMOSE et al., "Influence of Thermal and Flow Boundary Perturbations on Convection Heat Transfer Characteristics," Journal of The Japan Society of Mechanical Engineers (edition B), June 2000, Vol. 66, No. 646, pp. 215-221, and Kazunari MOMOSE et al., "Influence of Thermal and Flow Boundary Perturbations on Convection Heat Transfer Characteristics: Numerical Analysis Based on Adjoint Formulation", 2002 Wiley Periodicals, Inc., Heat Transfer Asian Research, 32(1): 1-12, 2003; Published online in Wiley InterScience (WWW.interscience.Wiley.com). DOI 10.1002/htj.10065).

According to the methods described in the above non-patent documents, in order to comprehensively evaluate the influence of thermal and flow boundary perturbations, a perturbation equation from the convection field, which is used as the reference, is introduced and the adjoint formulation to the perturbation equation is derived. In accordance with the problem, an adjoint problem and the boundary condition therefore are set. Using the numerical solution in the reference state together with the numerical solution to the adjoint problem, changes in various heat transfer characteristics to an arbitrary thermal perturbation and an arbitrary flow perturbation on the boundary are estimated.

SUMMARY OF THE INVENTION

As described above, methods which utilize the numerical analysis of adjoint problems have been studied. These methods have been merely of the level of investigative experiment based on simple models, and a general-purpose and highly convenient design support system usable in actual sites of design has not been existent.

Preferred embodiments of the present invention have been developed in light of these circumstances and provide a general-purpose and highly convenient design support method and design support system for a heat convection field or a mass diffusion field which significantly reduce the number of times a numerical simulation is required to examine the designing parameters for achieving the design purpose.

A design support method for a heat convection field or a mass diffusion field according to a preferred embodiment of the present invention include a modeling support step of supporting modeling of a designing space upon receipt of a signal from an input device operated by a user while displaying a predetermined image on a display device for displaying a graphic image, a mesh generation step of generating a mesh on the designing space model, a forward analysis step of analyzing either the heat convection field or the mass diffusion field of the designing space model by solving an equation of either the heat convection field or the mass diffusion field based on an initially set value of a designing parameter input through the input device regarding the meshed designing space model, a purpose setting step of supporting setting of a design purpose upon receipt of a signal from the input device while displaying a predetermined image on the display device, an inverse analysis step of analyzing a sensitivity defined by a change ratio of the design purpose with respect to a change in the designing parameter by solving an adjoint equation in correspondence with the design purpose based on the set design purpose, and a sensitivity display step of displaying information on the sensitivity analyzed by the inverse analysis as a graphic image on the display device.

The inverse analysis step may be a step of analyzing the sensitivity to a predetermined design purpose, regarding temperature, mass concentration, flow rate, or pressure, which is defined in a designing space, or the inverse analysis step may be a step of analyzing the sensitivity to a predetermined design purpose, regarding temperature, heat transfer amount, mass concentration, mass transfer amount, flow rate, or pressure, which is defined on a boundary of a designing space.

A design support system for a heat convection field or a mass diffusion field according to a preferred embodiment of the present invention includes an input device operable by a user, a computer, and a display device for displaying a graphic image for the user. The computer preferably includes a modeling support device arranged to support modeling of a designing space upon receipt of a signal from the input device while displaying a predetermined image on the display device, a mesh generation device arranged to generate a mesh on the designing space model, a forward analysis device arranged to analyze the heat convection field or the mass diffusion field of the designing space model by solving an equation of the heat convection field or the mass diffusion field based on an initially set value of a designing parameter input through the input device regarding the meshed designing space model, a purpose setting device arranged to support a setting of a design purpose upon receipt of a signal from the input device while displaying a predetermined image on the display device, an inverse analysis device arranged to analyze a sensitivity defined by a change ratio of the design purpose with respect to a change in the designing parameter by solving an adjoint equation in correspondence with the design purpose based on the set design purpose, and a sensitivity display device arranged to display information on the sensitivity analyzed by the inverse analysis as a graphic image on the display device.

A design support program for a heat convection field or a mass diffusion field according to a preferred embodiment of the present invention is for allowing a computer connected to an input device operable by a user and to a display device for displaying a graphic image for the user to function as a modeling support device arranged to support modeling of a designing space upon receipt of a signal from the input device while displaying a predetermined image on the display device, a mesh generation device arranged to generate a mesh on the designing space model, a forward analysis device arranged to analyze the heat convection field or the mass diffusion field of the designing space model by solving an equation of the heat convection field or the mass diffusion field based on an initially set value of a designing parameter input through the input device regarding the meshed designing space model, a purpose setting device arranged to support a setting of a design purpose upon receipt of a signal from the input device while displaying a predetermined image on the display device, an inverse analysis device arranged to analyze a sensitivity defined by a change ratio of the design purpose with respect to a change in the designing parameter by solving an adjoint equation in correspondence with the design purpose based on the set design purpose, and a sensitivity display device arranged to display information on the sensitivity analyzed by the inverse analysis as a graphic image on the display device.

The preferred embodiments of the present invention provide general-purpose and highly convenient design support for a heat convection field or a mass diffusion field which significantly reduces the number of times of numerical simulation required to examine the designing parameters for achieving the design purpose.

Other features, elements, steps, characteristics and advantages of the present invention will become more apparent from the following detailed description of preferred embodiments of the present invention with reference to the attached drawings.

BRIEF DESCRIPTION OF THE DRAWINGS

FIGS. 17A and 17B are tables showing calculation results of an inverse analysis.

DETAILED DESCRIPTION OF THE PREFERRED EMBODIMENTS

Figure 1:
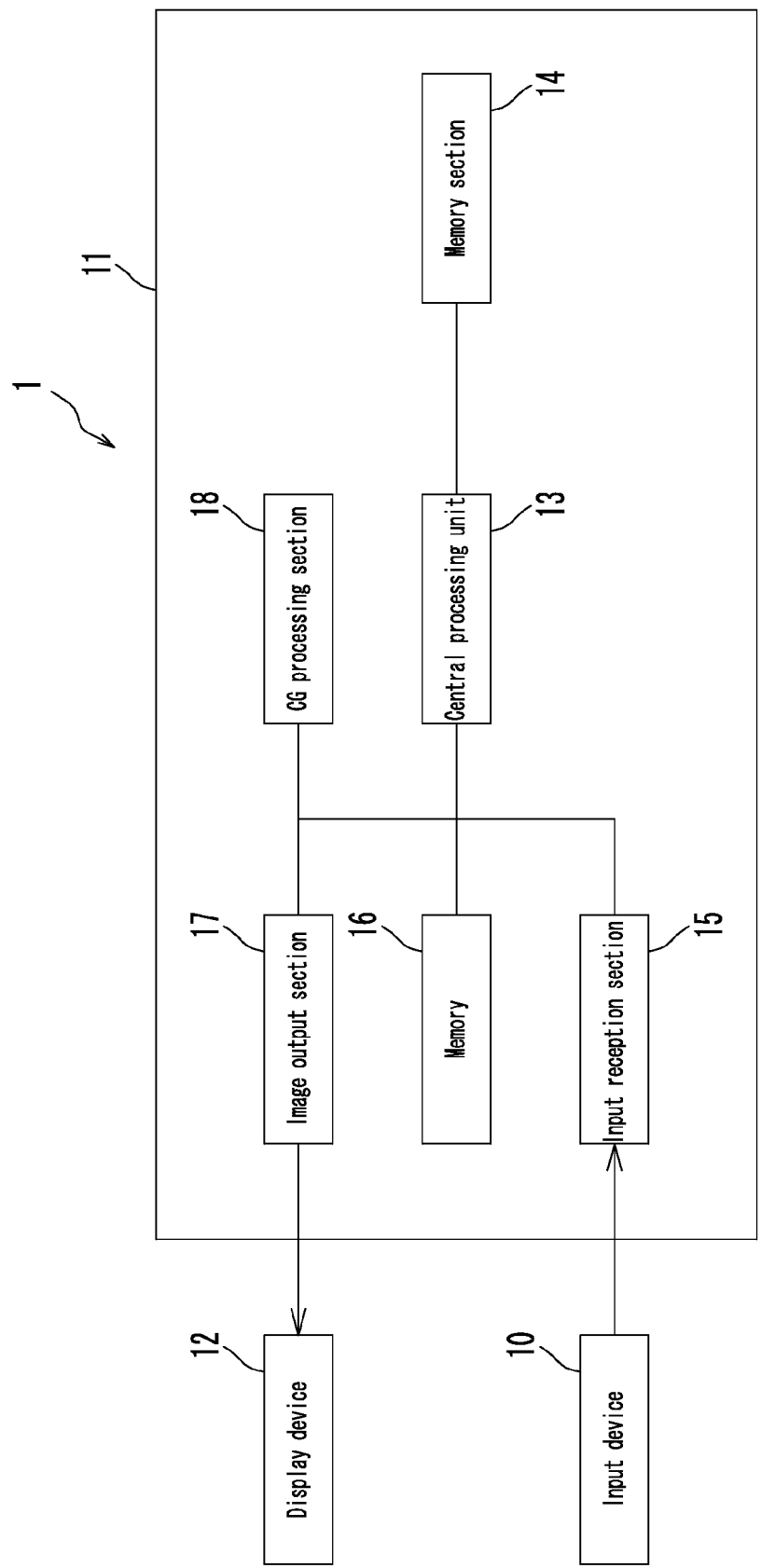
FIG. 1 is a structural view of a design support system according to a preferred embodiment of the present invention.

Hereinafter, preferred embodiments of the present invention will be described in detail with reference to the included drawings.

In one preferred embodiment according to the present invention, numerical analysis, for example, a forward analysis, is performed with predetermined boundary conditions (for example, initially set values of designing parameters). Using the results of the forward analysis, an inverse analysis is performed based on an adjoint numerical analysis. In this way, an analysis of sensitivity for a design purpose is performed. With the adjoint numerical analysis, the sensitivity to any number of designing variables and any distribution designing variable is obtained by performing a numerical analysis once. As a result, a quantitative and visual guide on how to improve the design is obtained. In another preferred embodiment, the result thus obtained is used together with mathematical programming. In this case, it is possible to realize an automatic optimization design support system for various devices or various spaces which use heat transfer or mass transfer.

In one preferred embodiment according to the present invention, governing equations of a heat convection field or a mass diffusion field (for example, conservation of mass, momentum, energy and concentration) are set as constraints and is formulated as a nonlinear optimization problem for maximizing or minimizing a given objective function (for example, local temperature, uniformity in a given area, deviation from the target value, etc.). By taking the first variation of the objective function (Lagrangian), the adjoint problem linearized in the vicinity of a given state (for example, the current designing result) can be defined. By solving the adjoint problem (conservation equation of mass, momentum, energy and concentration in the adjoint field) using a technique of numerical simulation under an appropriate homogeneous boundary condition (which varies depending on the definition of the objective function, but can be determined separately from the physical boundary condition), a change ratio (for example, a sensitivity) of the objective function (for example, a design purpose regarding either the temperature, mass concentration, flow rate, pressure, etc. defined in the designing space, or the temperature, heat transfer amount, mass concentration, mass transfer amount, flow rate, pressure, etc. defined on the boundary of the designing space) to a change in an arbitrary boundary condition (designing parameter) can be found.

In the following, the principle of inverse analysis based on adjoint numerical analysis will be first described, and then a structure of a design support system 1 and a design support method according to this preferred embodiment will be described.

Principle of Inverse Analysis Based on Adjoint Numerical Analysis

A objective function which is to be the design purpose is defined as:

Equation 1

$$J = \int_\Omega f_T d\Omega + \int_\Omega f_C d\Omega + \int_\Omega f_u d\Omega + \int_\Omega f_p d\Omega + \int_{\Gamma_T} g_T d\Gamma + \int_{\Gamma_q} g_q d\Gamma + \int_{\Gamma_C} g_C d\Gamma + \int_{\Gamma_m} g_m d\Gamma + \int_{\Gamma_u} g_u d\Gamma \quad (1)$$

where Q is an arbitrary designing space accompanying heat flow and mass diffusion. Here, Ft, Fc, fu and fp are functions regarding the temperature, mass concentration, flow rate and pressure defined in the space Q, and are determined by the design purpose (for example, maximization, minimization, uniformization or the like of the temperature, mass concentration, flow rate and pressure in a given area). ΓT, Γq, ΓC, Γm and Γu are respectively boundaries of the space Q in which the temperature, heat flux, concentration, diffusion flux and flow rate vector are controllable. Gt, gq, Gc, gm and gu are design purposes defined on the respective boundaries (for example, maximization, minimization or the like of the heat transfer amount on the boundary, mass transfer amount on the boundary, or the flow rate on the boundary).

The inverse analysis determines an optimum boundary condition for maximizing or minimizing the above-described objective functions. The optimum boundary condition needs to fulfill physical laws of the field (for example, conservation of mass, momentum, energy and concentration). Therefore, the Lagrangian L having these as the constraints is defined as:

Equation 2

$$L = J + \int_\Omega [p^*, u^*, T^*, C^*] A(p, u, T, C) d\Omega \quad (2)$$

where A is a vector formed of governing equations of the field having the pressure p, the flow rate vector u, the temperature T and the concentration C as the dependent variables (six nonlinear partial differential equations representing the conservation of mass, momentum, energy and concentration). P*, u*, T* and C* are weight functions on these restrictions (herein, these functions will be referred to as adjoint variables for the sake of convenience). When each physical amount fulfills the respective conservation law, L=J, and the objective function matches the Lagrangian.

Now, it is assumed that the boundary condition changes by a minute amount to perform perturbation expansion of the governing equation A in the vicinity of the reference state (for example, in the vicinity of the current designing state) The obtained linear perturbation equation system is applied to the first variation of equation (2) and then divided into domain integrals and boundary integrals with Gauss's divergence theorem or the like. Then, an adjoint operator matrix A* to the linear perturbation equation system is obtained. Using the adjoint operator matrix A*, the adjoint problem (the conservation equation of mass, momentum, energy and concentration in an adjoint field having adjoint pressure p*, adjoint flow rate u*, adjoint temperature T* and adjoint concentration C* as dependent variables) and the boundary conditions thereof are selected as follows.

Equation 3

$$A^*[p^*, u^*, T^*, C^*]^T = \left[\frac{\partial f_p}{\partial p}, \frac{\partial f_u}{\partial u}, \frac{\partial f_T}{\partial T}, \frac{\partial f_C}{\partial C}\right] \quad (3)$$

$$T^* = -\frac{\partial g_T}{\partial q} \text{ on } \Gamma_T, \quad (4)$$

$$q^* = -\frac{\partial g_q}{\partial T} \text{ on } \Gamma_q,$$

$$q^* = KT^* \text{ on } \Gamma_K$$

$$C^* = -\frac{\partial g_C}{\partial m} \text{ on } \Gamma_C,$$

$$m^* = -\frac{\partial g_m}{\partial C} \text{ on } \Gamma_m,$$

$$u^* = -\frac{\partial g_u}{\partial \sigma} \text{ on } \Gamma_u$$

In this way, the first variation of the objective function accompanying the minute change in the boundary condition can be represented only by the term of the boundary integrals as follows.

Equation 4

$$\delta J = \int_{\Gamma_q} T^* \delta q d\Gamma + \int_{\Gamma_T} q^* \delta T d\Gamma + \int_{\Gamma_K} (T_{outside} - T) T^* \delta K d\Gamma + \int_{\Gamma_m} C^* \delta m d\Gamma + \int_{\Gamma_C} m^* \delta C d\Gamma + \int_{\Gamma_u} \sigma^* \cdot \delta u d\Gamma \quad (5)$$

Namely, by once numerically solving the adjoint problem (3) under the boundary condition (4), T* on the boundary (influence of the heat flux change δq on the boundary), q* (influence of the temperature change δT on the boundary), C* (influence of the diffusion flux change δm on the boundary), m* (influence of the concentration change δC on the boundary), and σ* (influence of the flow rate vector change δu on the boundary) are obtained at the same time. Thus, the change (sensitivity) of the objective function to the changes of all the controllable boundary conditions are found. The third term of the right side of equation (5) represents the sensitivity to the change δK in the overall heat transfer coefficient through a wall, which is not actively controllable but is important in designing. Such sensitivity is usable to evaluate the influence of the structure (for example, a heat insulating capability) of the wall, a window glass, or the like.

Hereinafter, specific examples of setting the objective function and the adjoint problem will be described.

(i) Maximization of Local Temperature

Where a minute area is Ωe and the volume thereof is Ve, the objective function (average temperature of the minute area) is defined as follows.

$$J = \frac{1}{V_e} \int_{\Omega_e} T(x) \, d\Omega \qquad \text{Equation 5}$$

Then, from equations (3) and (4), the following is obtained.

$$f_T = T(x)/V_e, x \in \Omega_e, f_C = g_T = g_q = g_C = g_m = g_u = 0 \qquad \text{Equation 6}$$

Then, the following is obtained.

$$A^*[p^*, u^*, T^*, C^*]^T = [0, 0, \alpha(x), 0]^T, \qquad \text{Equation 7}$$

$$\alpha(x) = \begin{cases} 1/V_e & x \in \Omega_e \\ 0 & x \notin \Omega_e \end{cases}$$

$$T^* = 0 \text{ on } \Gamma_T, q^* = 0 \text{ on } \Gamma_q, q^* = KT^* \text{ on } \Gamma_K$$

$$C^* = 0 \text{ on } \Gamma_C, m^* = 0 \text{ on } \Gamma_m, u^* = 0 \text{ on } \Gamma_u$$

By solving the adjoint problem under the homogeneous boundary conditions in this manner, the change (sensitivity) in the objective function (local temperature) to the change in each boundary condition can be found from equation (5).

(ii) Uniformization of the Area Temperature

The target area is set to $\Omega D$, and the volume thereof is set to VD, and the average temperature in the area before the optimization is set to Tav. The objective function is defined as a variance from the average temperature as follows.

$$J = -\frac{1}{V_D} \int_{\Omega_D} (T_{av} - T)^2 \, d\Omega \qquad \text{Equation 8}$$

Then, from equation 9, equation 10 is obtained (the boundary conditions are the same as those in section (i)).

$$f_T = -(T_{av} - T)^2 / V_D, \, x \in \Omega_D \qquad \text{Equation 9}$$

$$A^*[p^*, u^*, T^*, C^*]^T = [0, 0, \alpha(x), 0]^T, \qquad \text{Equation 10}$$

$$\alpha(x) = \begin{cases} 2(T_{av} - T(x))/V_D & x \in \Omega_D \\ 0 & x \notin \Omega_D \end{cases}$$

In this case also, the influence of each boundary condition to the uniformity (variance amount) can be evaluated from equation (5). For actual implementation, the objective function is converted into the deviation (on the unit of temperature), instead of the variance, such that the degree of variance can be intuitively perceived.

(iii) Realization of the Target Value

Where the volume and target temperature of n pieces of different areas $\Omega i$ (i=1, n) are respectively set to Vi, Ti (i=1, n), the objective function is defined as follows.

$$J = -\sum_{i=1}^{n} \frac{1}{V_i} \int_{\Omega_i} (T_i - T)^2 \, d\Omega \qquad \text{Equation 11}$$

Then, from equation 12, equation 13 is obtained (the boundary conditions are the same as those in sections (i) and (ii)).

$$f_T = -\sum_{i=1}^{n} (T_i - T)^2 / V_i \qquad \text{Equation 12}$$

$$A^*[p^*, u^*, T^*, C^*]^T = \left[0, 0, \sum_{i=1}^{n} \alpha_i(x), 0\right]^T, \qquad \text{Equation 13}$$

$$\alpha_i(x) = \begin{cases} 2(T_i - T(x))/V_i & x \in \Omega_i \\ 0 & x \notin \Omega_i \end{cases}, (i = 1, n)$$

In this case also, for implementation, the objective function is converted into the deviation (on the unit of temperature), instead of the variance, such that an error is perceived intuitively.

(iv) Maximization of the Heat Transfer Amount on the Boundary

Finally, the problem of maximizing the heat transfer amount on the boundary ΓT will be discussed as an example of setting the design purpose on the boundary. The following total heat transfer amount on the boundary is considered as the objective function.

$$J = \int_{\Gamma_T} q \, d\Gamma \qquad \text{Equation 14}$$

Then, from equation 15, $$g_T = q, f_T = f_C = g_q = g_C = g_m = g_u = 0 \qquad \text{Equation 15}$$

the adjoint problem to this problem and the boundary conditions thereof are given by the following.

$$A^*[p^*, u^*, T^*, C^*]^T = [0,0,0,0]^T \, T^* = -1 \text{ on } \Gamma_T, q^* = 0 \text{ on } \Gamma_q, q^* = KT^* \text{ on } \Gamma_K \, C^* = 0 \text{ on } \Gamma_C, m^* = 0 \text{ on } \Gamma_m, u^* = 0 \text{ on } \Gamma_u \qquad \text{Equation 16}$$

In addition, in the same manner as in the purpose setting in the area described above in sections (i), (ii) and (iii), the problems of maximizing the local temperature on the boundary, uniformizing the temperature on the boundary, achieving the target temperature on a plurality of boundaries and the like can be easily set.

In the above examples, the purpose setting is limited to heat environment for the sake of simplicity. A purpose can be derived in a similar manner for mass diffusion, flow rate and pressure from equations (3) and (4). In the above purpose setting examples, maximization, uniformization and the target value realization are mentioned. Alternatively, based on equations (1), (3) and (4), the design purpose may be anything which is a function on the temperature, mass concentration, flow rate or pressure in the designing space or a function on the temperature, thermal flow rate, mass concentration, diffusion flux or flow rate on the boundary of the designing space and is differentiable once for each physical amount. Any such purpose can be appropriately set as required by the designer.

Design Support System

Next, a design support system according to this preferred embodiment will be described.

As shown in FIG. 1, a design support system 1 includes an input device 10 including a keyboard, a mouse or the like, a computer 11, and a display device 12 including an LCD, a CRT or the like. The computer 11 includes a central processing unit 13, a memory device 14 including a hard disc drive or the like, an input reception section 15 for receiving a signal from the input device 10, a memory 16, an image output section 17 for outputting a signal to the display device 12, and a CG processing section 18. However, the specific structure of the design support system 1 is not limited to the above-described structure, and the design support system could be implemented using any desirable equivalent structure.

A design support program according to this preferred embodiment is a computer program for allowing the computer 11 to perform the functions described below. The computer 11 only needs to be communicable with the input device 10 and the display device 12, and may be connected thereto in a wired or wireless manner. The computer 11 may be installed at a different site from the input device 10 or the display device 12. For example, the computer 11 may be connected to a terminal device on the designer side via a network (in a wired or wireless manner).

Figure 2:
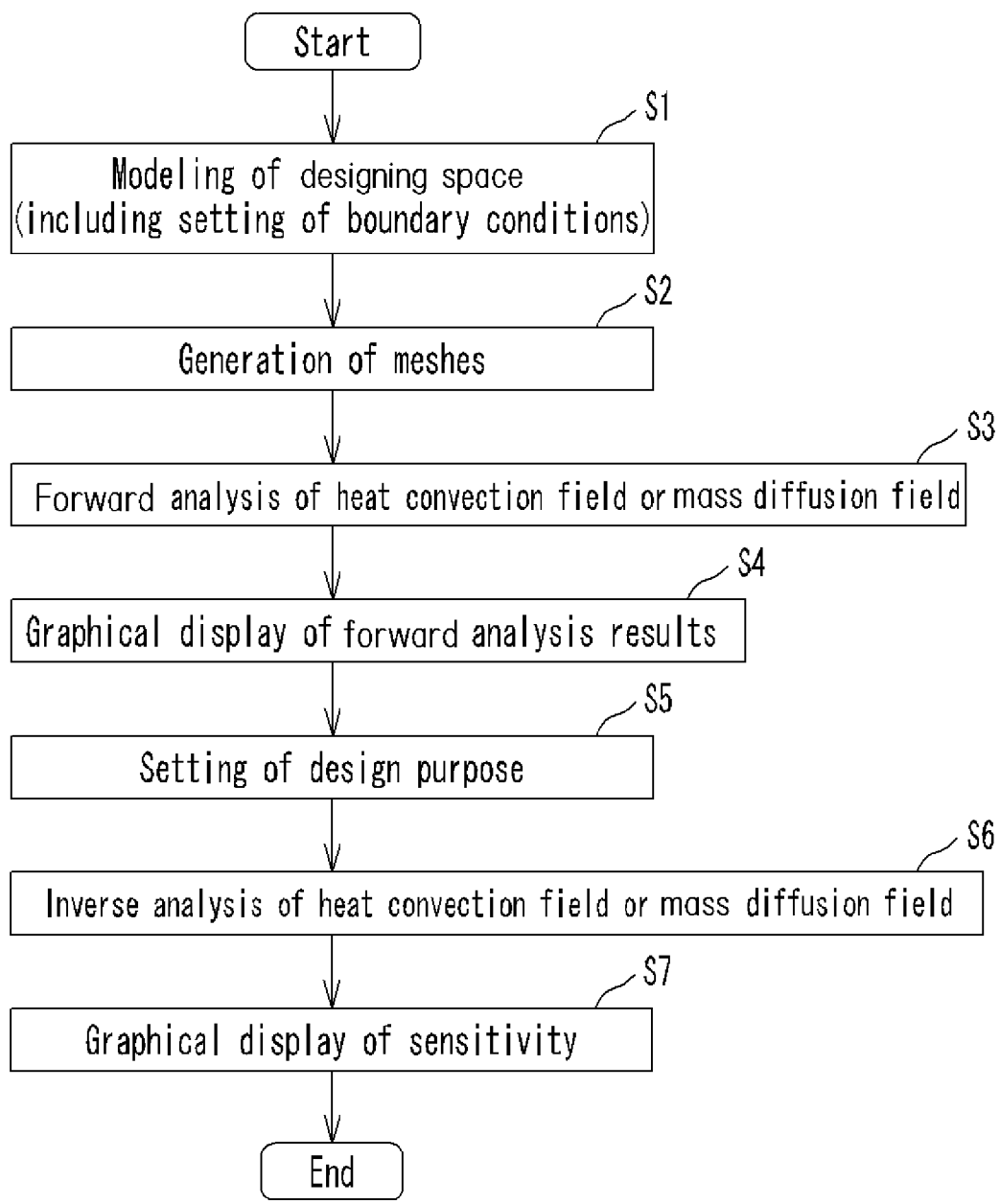
FIG. 2 is a flowchart showing a portion of a method for designing an indoor environment.
Figure 3:
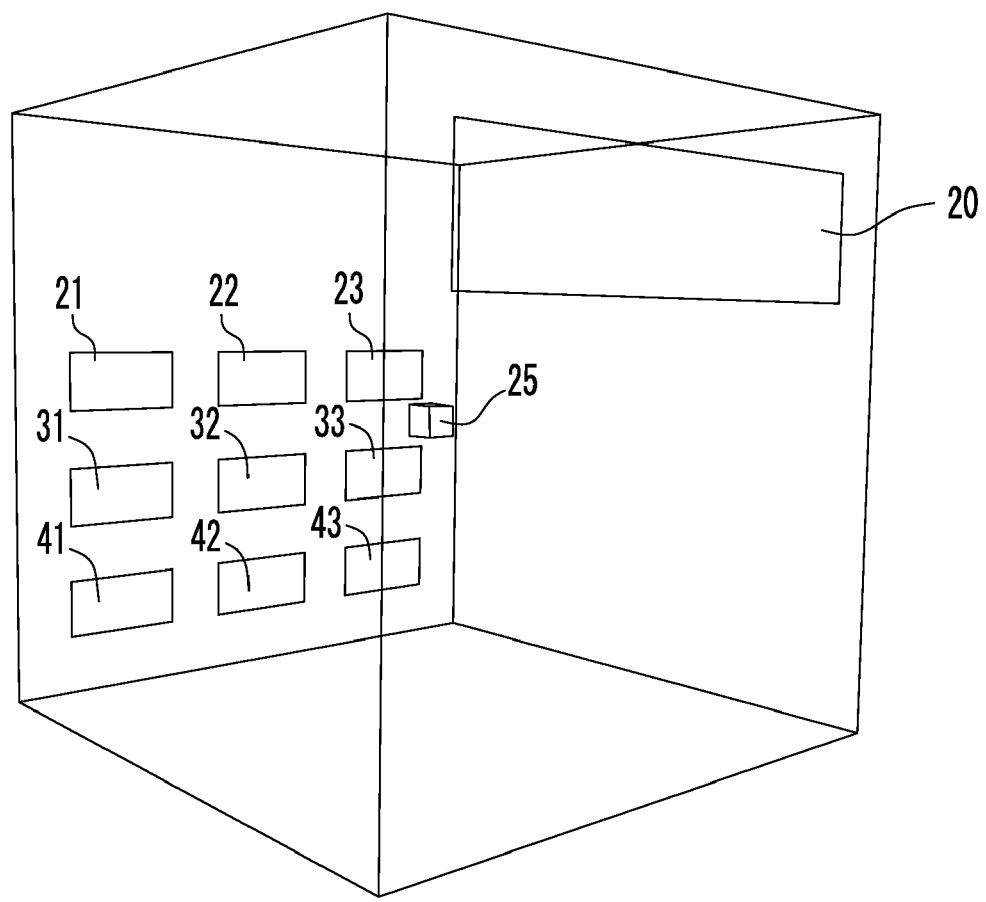
FIG. 3 shows an example of an image display representing an example of analytical model.

With reference to FIG. 2, a flow of method for designing a heat convection field and a mass diffusion field according to this preferred embodiment will be described. In the following, the designing method will be described regarding a specific example for easier understanding. In this example, as shown in FIG. 3, the design is to be made on an indoor space having nine blowoff outlets (upper blowoff outlets 21 through 23, middle blowoff outlets 31 through 33, and lower blowoff outlets 41 through 43) and one opening 20. The temperature at the center of the indoor space is to be maximized.

Positional information designated at the time of designing is not limited to information on a predetermined point, and may be information on a predetermined area. In this preferred embodiment, the center of the indoor space is designated as the predetermined point. Such a point or area may be designated with a coordinate value (numerical value) using the keyboard or the like. In this preferred embodiment, a point or area can be designated on a screen by clicking and dragging the mouse for improved convenience. The point or area designated in this manner is graphically displayed in a designing space model as a target 25.

First, in step S1, a designing space model is created. The system 1 has a model creation function, and the user (designer) uses the input device 10 (for example, inputs a command to the keyboard or performs an operation on the mouse such as clicking, dragging or the like) to select a menu bar, draw, input a command or the like. Thus, an arbitrary designing space can be set easily. As described above, in this example, an indoor space model is set as shown in FIG. 3. In this indoor space, nine blowoff outlets (upper blowoff outlets 21 through 23, middle blowoff outlets 31 through 33, and lower blowoff outlets 41 through 43) are formed in one of two walls facing each other, one opening 20 is formed in an upper part of the other wall, and the ceiling and the floor are cooling faces. In this preferred embodiment, initial values (boundary conditions) of designing parameters are also set when the model is created. The designing parameters are, for example, a temperature of the air blown through each blowoff outlet, the blowing direction, the blowing speed, the temperature of the ceiling and the floor, etc. The designing parameters may be set by a different step from the creation of the model (step S1).

Next, the "mesh (M)" button in the menu bar (see FIG. 6A) is clicked to automatically generate meshes on the model (step S2). The number of meshes may be set to a predetermined value or appropriately set by the user. Namely, the number of meshes may be increased in order to raise the precision of analysis, or may be decreased in order to raise the speed of analysis. The design support system 1 may be set to allow the user to freely select the number of meshes.

Figure 4:
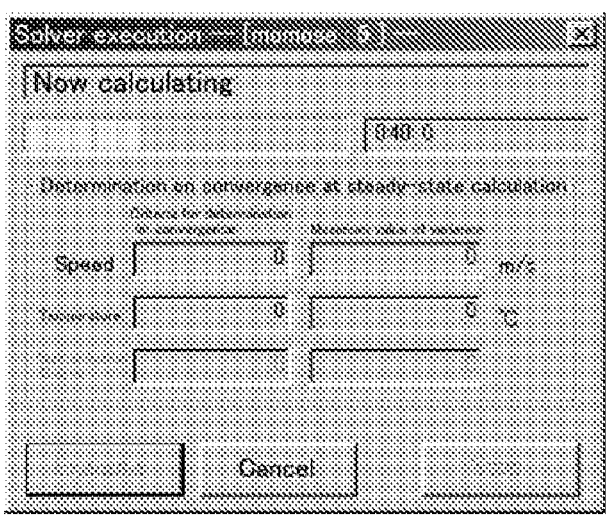
FIG. 4 is an example of an image display of a forward analysis.
Figure 6A:
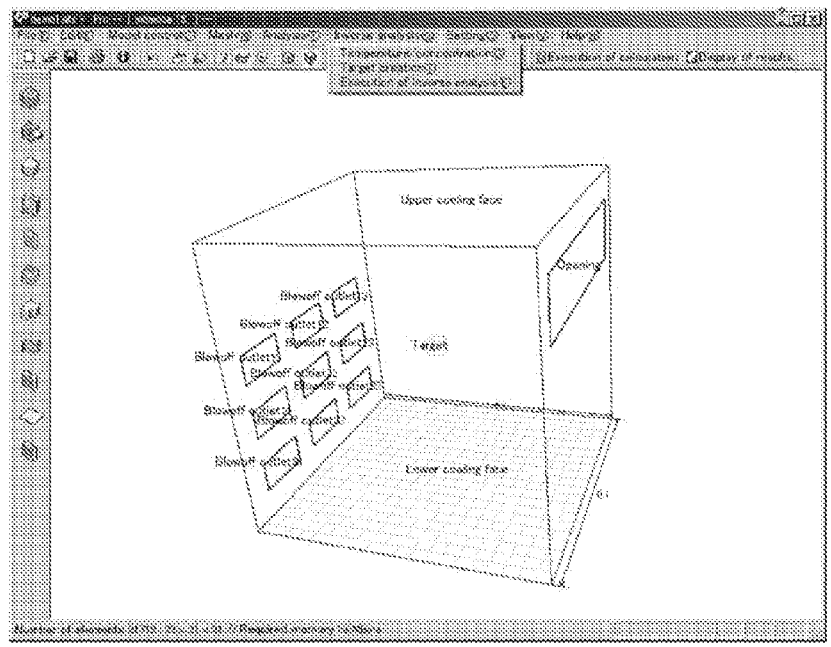
FIGS. 6A, 6B and 6C are examples of image displays representing the purpose setting of an inverse analysis.

After the meshes are automatically generated, the user clicks the "analysis (T)" button in the menu bar (see FIG. 6A). By this, numerical analysis (forward analysis) is executed based on the model and the initial values of the designing parameters (step S3). FIG. 4 shows an exemplary image shown on the display device during the forward analysis.

Figure 5A:
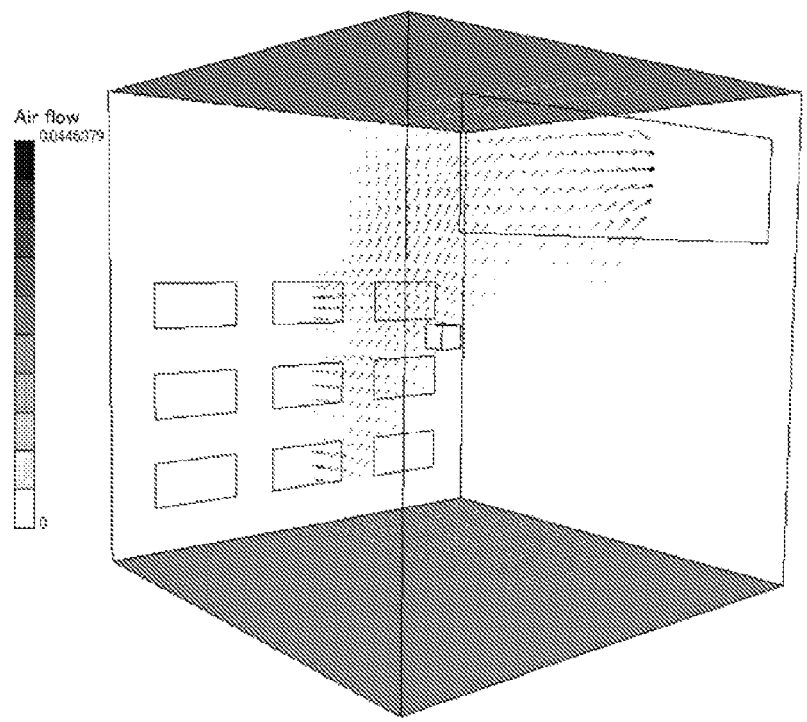
FIGS. 5A and 5B are examples of an image display representing results of forward analysis.
Figure 5B:
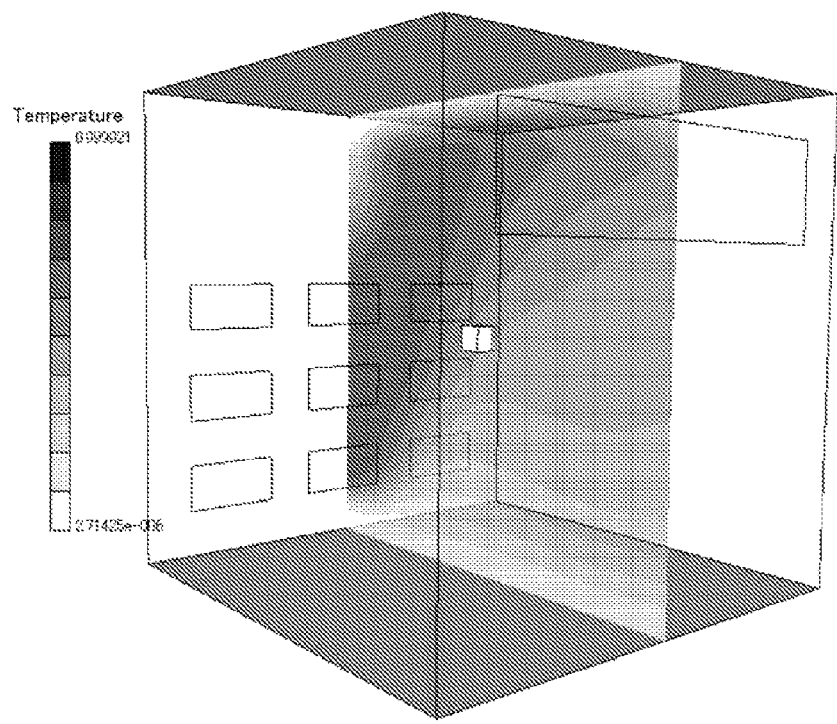

When the forward analysis is finished and the user clicks the "view (V)" button in the menu bar (see FIG. 6A), the speed distribution and temperature distribution on an arbitrary face of the model are displayed as shown in FIGS. 5A and 5B (step S4). The face to be displayed may be changed easily using the mouse, or the like. The image of speed distribution (see FIG. 5A) and the image of temperature distribution (see FIG. 5B) may be easily switched in order to replace one with the other.

Figure 6B:
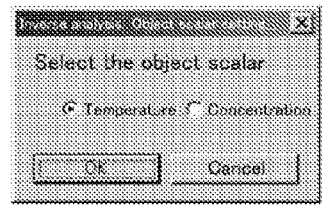
Figure 6C:
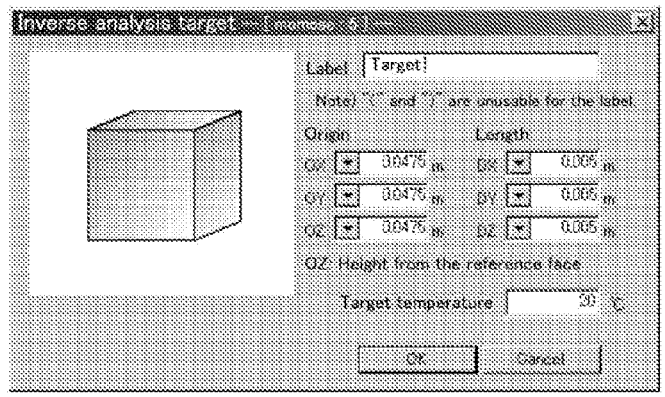

Next, an inverse analysis is performed. For inverse analysis, the design purpose is first set (step S5). In this example, the design purpose is to maximize the temperature at the center of the indoor space. Therefore, the above-mentioned target 25 is created at the center of the indoor space (see FIG. 6A), and the object scalar is set to the temperature (see FIG. 6B). The target 25 is set small enough to look substantially like a point (see FIG. 6C). In the case where the target 25 is a predetermined area, the target 25 may be set large in the image of FIG. 6C. In this example, there is one target 25. In the case where the design purpose is regarding, for example, the temperature at a plurality of points in the indoor space, a plurality of targets 25 may be set.

Figure 7A:
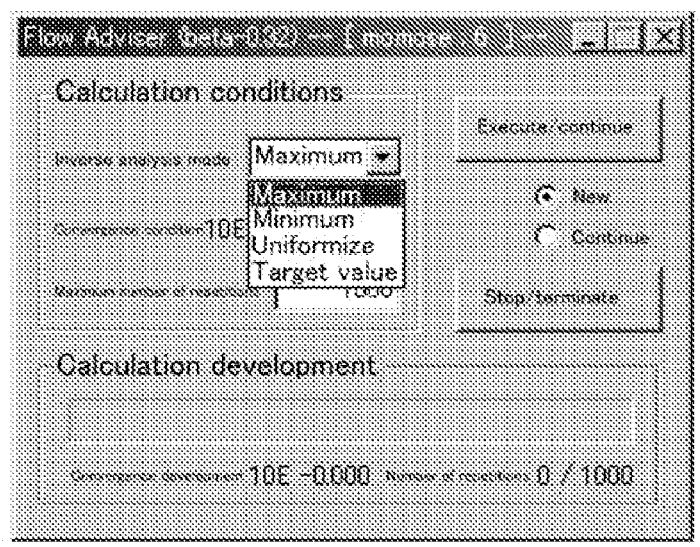
FIGS. 7A and 7B are examples of an image display representing an inverse analysis.
Figure 7B:
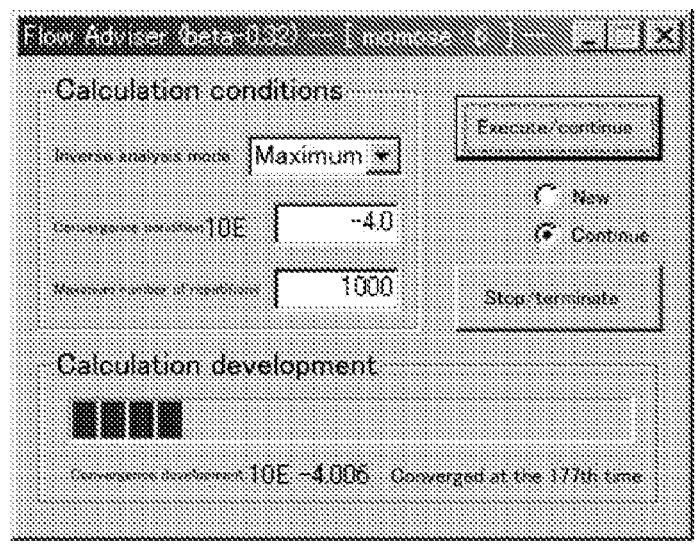

Next, as shown in FIG. 7A, the computer is set to the inverse analysis mode "maximize" and other conditions are also set (in this example, convergence conditions and maximum possible number of time of repetition). Then, the execution/continue button is clicked. Then, as shown in FIG. 7B, the inverse analysis is executed (step S6).

The inverse analysis is finished and the user clicks the "view (V)" button in the menu bar. Then, as shown in FIGS. 8A, 8B, 9A, 9B, and 10A, the sensitivity of each parameter (a ratio of change in the design purpose with respect to a change in each design parameter; in this example, in the case where the temperature at the center of the indoor space is to be raised, how much influence is exerted on the temperature at the center of the indoor space by the change in the blowoff temperature or the like) is displayed quantitatively and visually (step S7). The user may then use the keyboard, mouse or the like to arbitrarily switch the images displaying the sensitivity to the parameters.

FIGS. 8A, 8B, 9A, 9B, and 10A show the level of sensitivity with the level of color darkness as an example. The manner of displaying the sensitivity is not specifically limited, and the level of sensitivity may be displayed with contour lines, colors (e.g., red for a highly sensitive area and blue for a non-sensitive area) or gradation levels. The level of sensitivity may be displayed with a graph.

The system 1 performs the above-described design support operation. Then, the user examines the designing particulars while checking the sensitivity displayed on the screen.

Figure 8A:
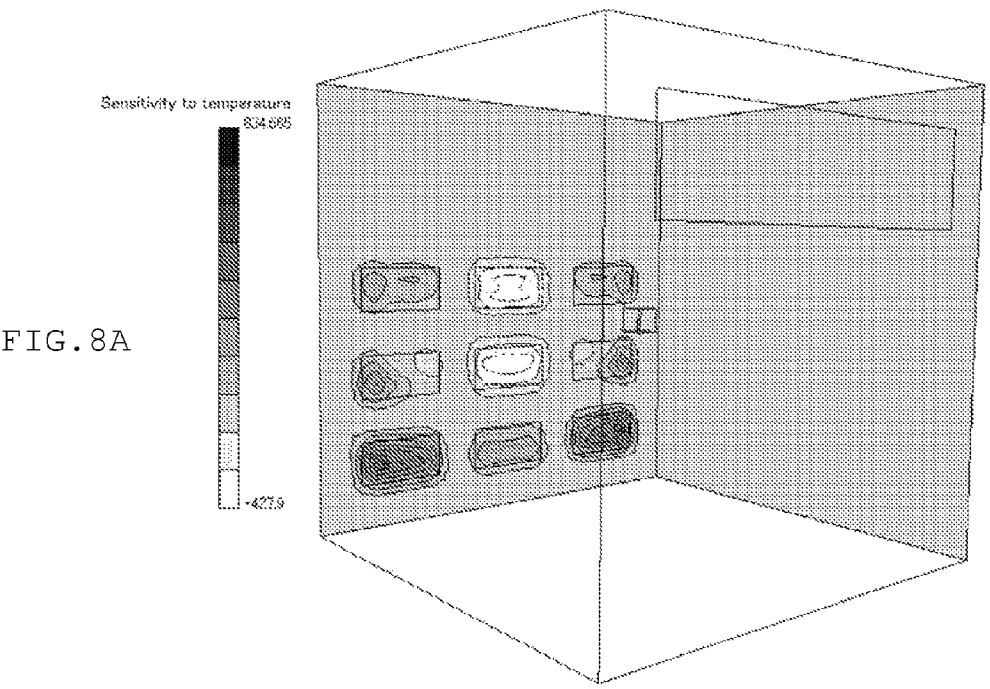
FIGS. 8A and 8B are examples of an image display representing sensitivity.

For example, referring to FIG. 8A, it is understood that in order to raise the temperature at the center of the indoor space, it is most efficient to raise the blowoff temperature at the lower left and lower right blowoff outlets 41 and 43 (hereinafter, regarding the reference numerals, see FIG. 3) and to lower the blowoff temperature at the upper middle and central outlets 22 and 32.

Figure 8B:
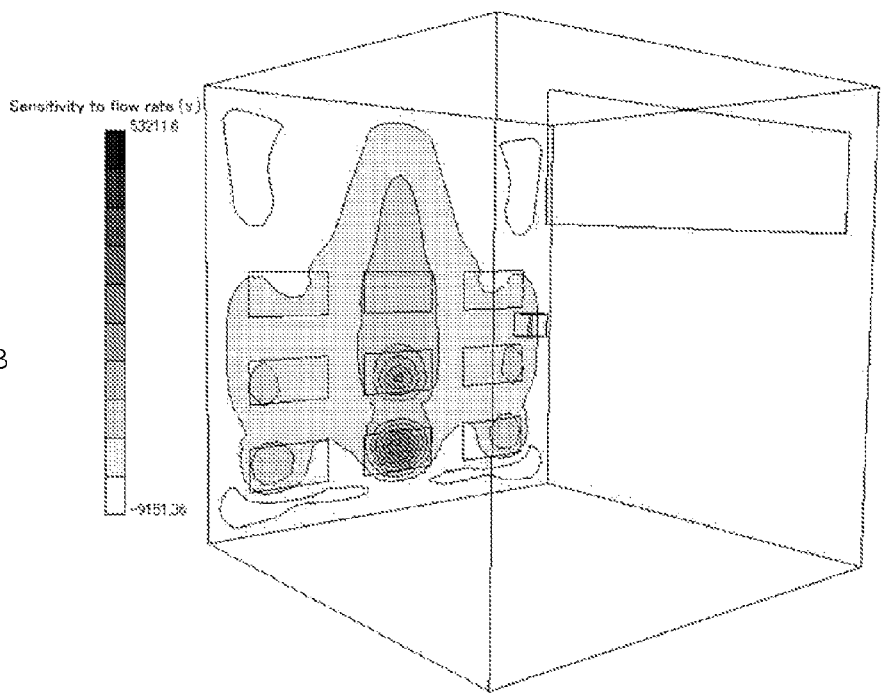
Figure 9A:
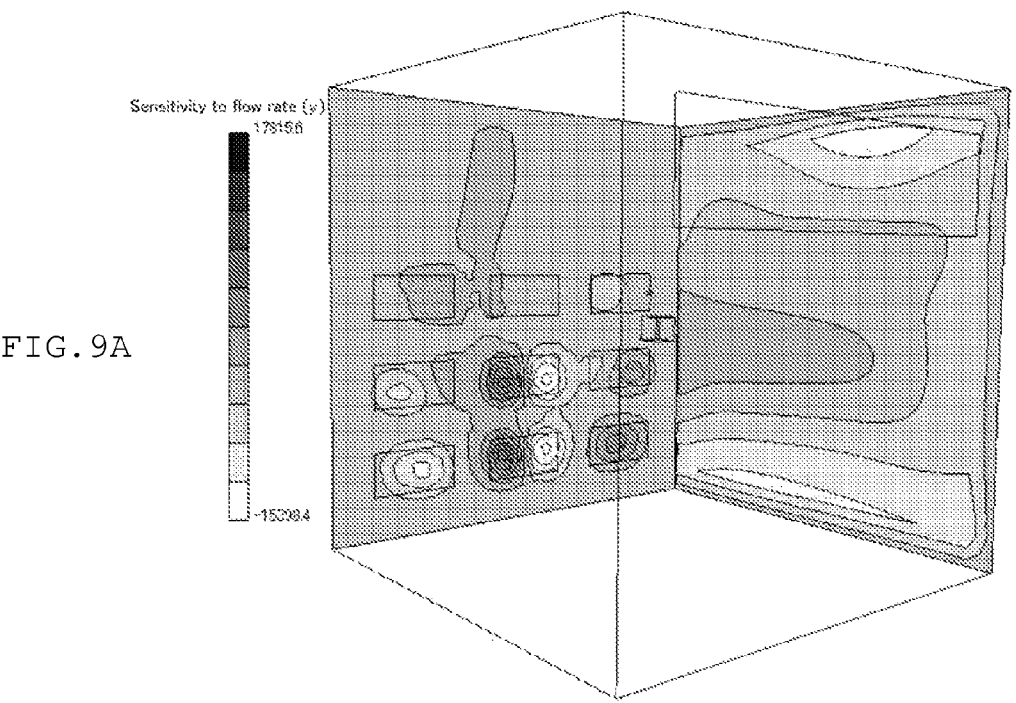
FIGS. 9A and 9B are examples of an image display representing sensitivity.
Figure 9B:
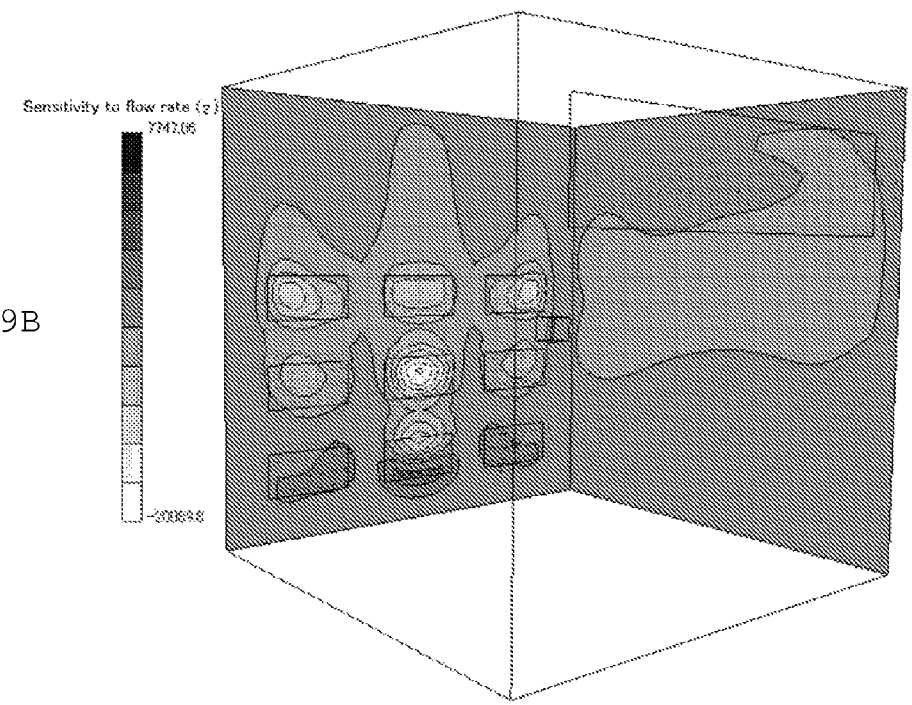

Referring to FIG. 8B, it is understood that for raising the temperature at the center of the indoor space, it is preferable to increase the flow rate in the blowoff direction at the lower middle blowoff outlet 42. Referring to FIG. 9B, it is understood that it is preferable to increase the flow rate in the vertical direction at the lower middle blowoff outlet 42.

Figure 10A:
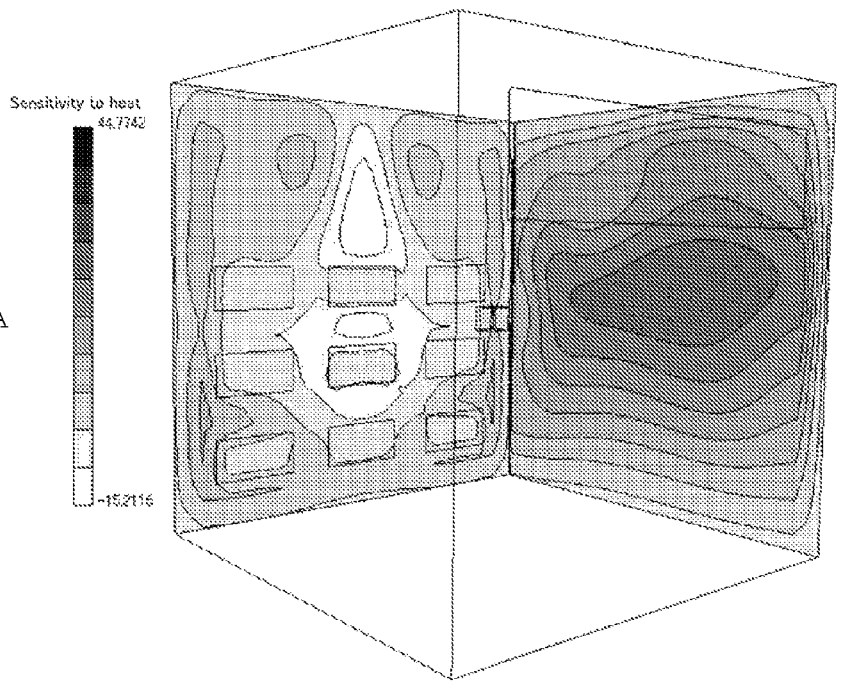
FIGS. 10A and 10B are examples of an image display representing sensitivity.

Referring to FIG. 10A, it is understood that it is preferable to increase the heating amount at the central position in the top-bottom direction of the wall. Accordingly, it is conceivable to, for example, install a heater at this position.

Figure 10B:
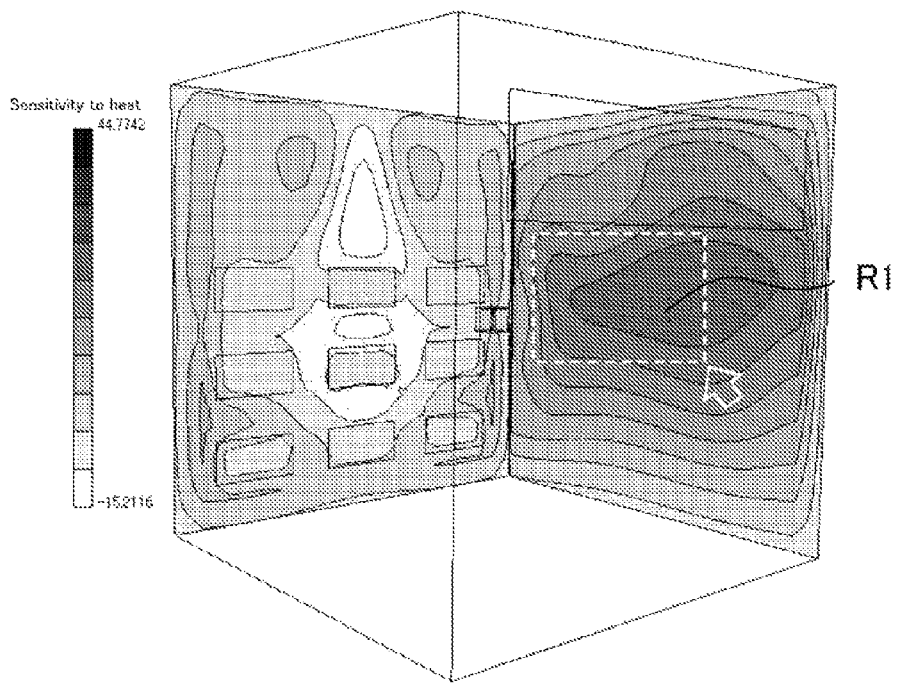

In this preferred embodiment, when the user designates an area via the input device 10, the sensitivity of the area is displayed on the screen of the display device 12. For example, when the user, for example, drags the mouse to designate a predetermined area R1 on the screen shown in FIG. 10B, a temperature change of the target with respect to a change in the heating amount in the area R1 is displayed on the screen. In this example, it is shown that when the heating amount in the area R1 is increased by 1 Kw, the temperature of the target is increased by 0.5124° C. Based on this, when a heater is to be installed on the wall, a rough estimate on the heating amount required of the heater can be obtained by designating an area corresponding to the area size of the heater at the position where the heater is to be installed.

Figure 11A:
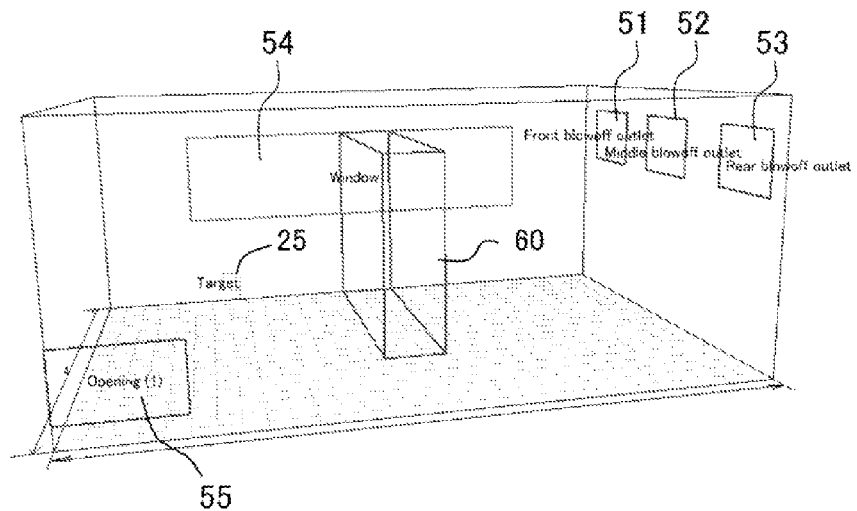
FIGS. 11A and 11B are examples of an image display representing another example of an analytical model.
Figure 11B:
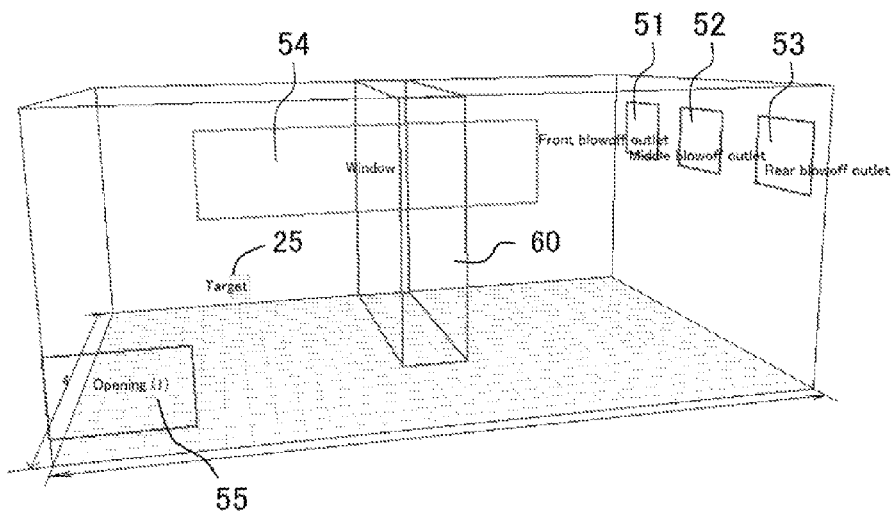

Next, another specific example will be described. In this example, two models are compared. As shown in FIG. 11A and FIG. 11B, in this example, the design is to be made on a rectangular parallelepiped indoor space. Three blowoff outlets 51, 52 and 53 are provided on one of two walls facing each other in a longitudinal direction. A window 54 is provided on one of two walls perpendicular to the wall having the blowoff outlets. An opening 55 is provided on the wall facing the wall having the window 54. A partition 60 is provided at the center of the room. In the exemplary model of FIG. 11A, the partition 60 does not reach the ceiling with a gap being made between the partition 60 and the ceiling. By contrast, in the exemplary model of FIG. 11B, the partition 60 reaches the ceiling.

Figure 12A:
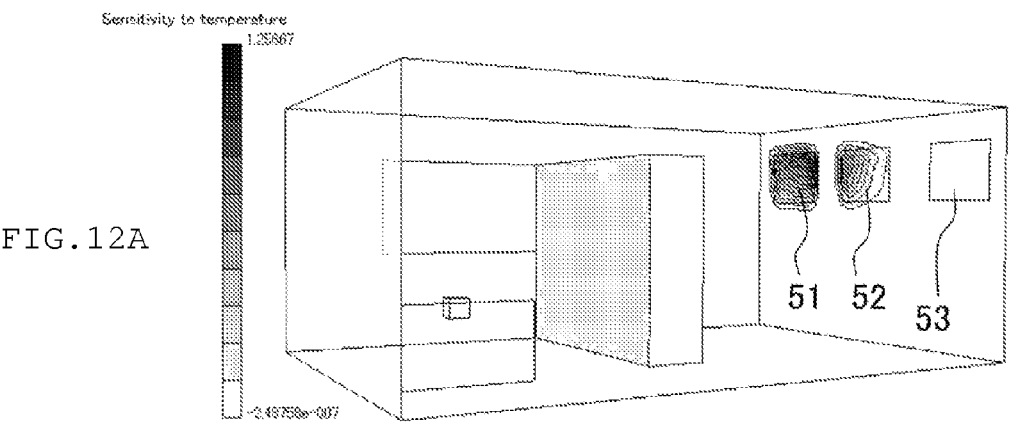
FIGS. 12A and 12B are examples of an image display representing sensitivity to the temperature.

FIGS. 12A through 17B show the results of numerical analysis performed on each of the above exemplary models in substantially the same manner as described above. FIGS. 12A and 12B show the sensitivity to the temperature. FIGS. 13A and 13B show the sensitivity to the heating amount on the wall. FIGS. 14A and 14B show the sensitivity to the air flow in the blowoff direction (X direction) on the wall. FIGS. 15A and 15B show the sensitivity to the air flow in the vertical direction (Z direction). FIGS. 16A and 16B show the sensitivity to the overall heat transfer coefficient through the window. FIGS. 17A and 17B show numerical data on the sensitivity to each of the designing parameters.

Figure 12B:
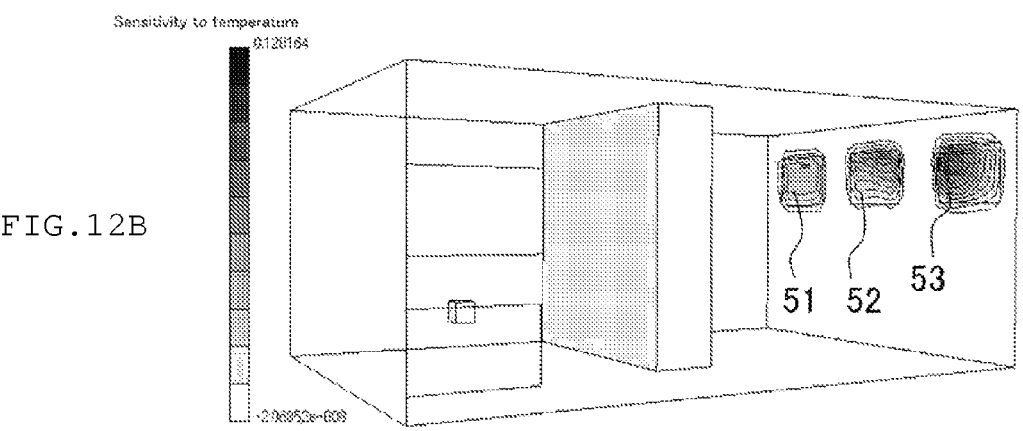
Figure 13A:
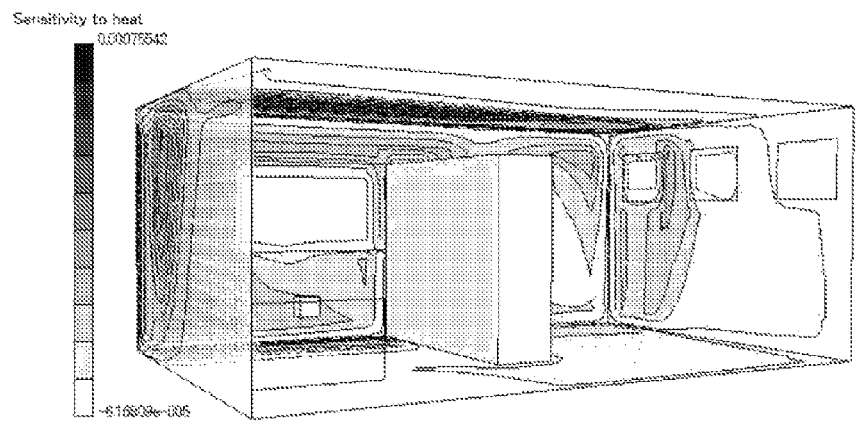
FIGS. 13A and 13B are examples of an image display representing sensitivity to heat.
Figure 13B:
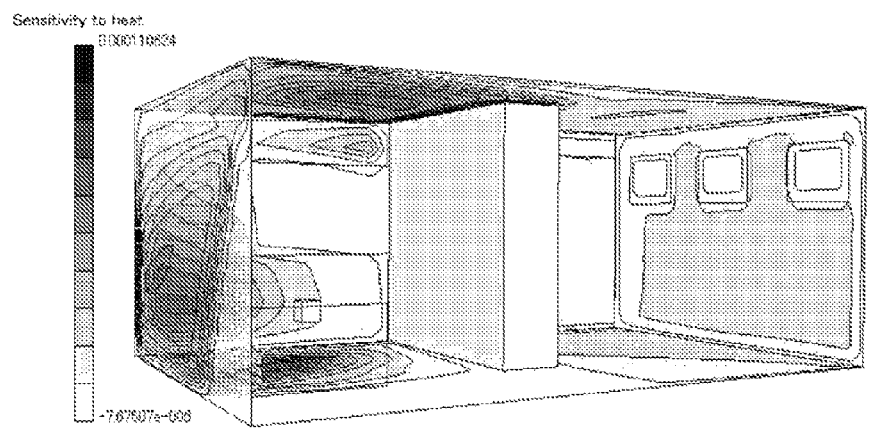
Figure 14A:
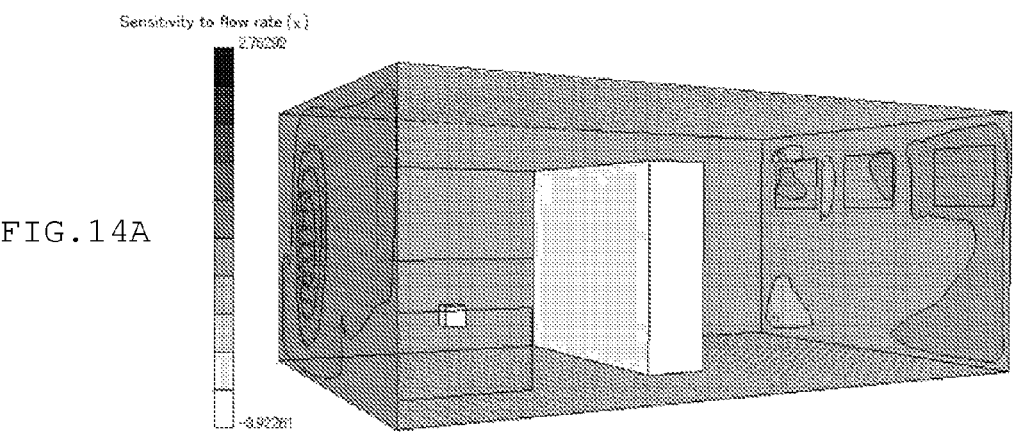
FIGS. 14A and 14B are examples of an image display representing sensitivity to the air flow in an X direction.
Figure 14B:
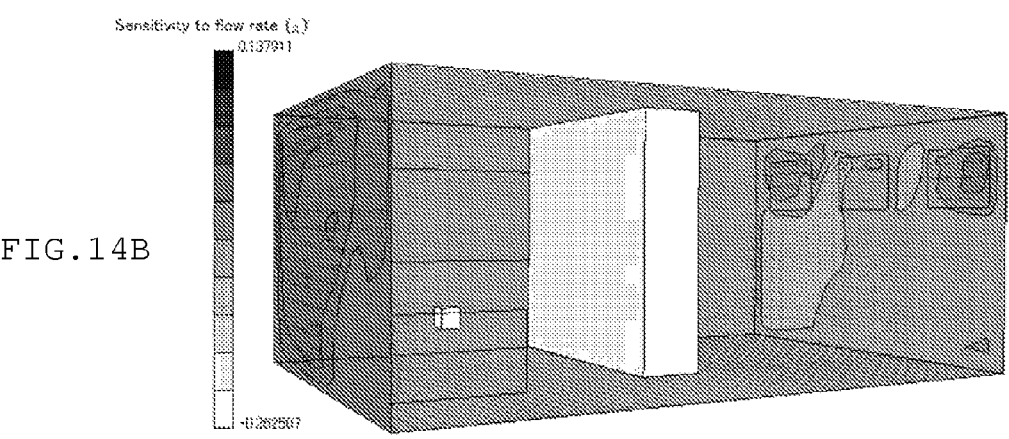
Figure 15A:
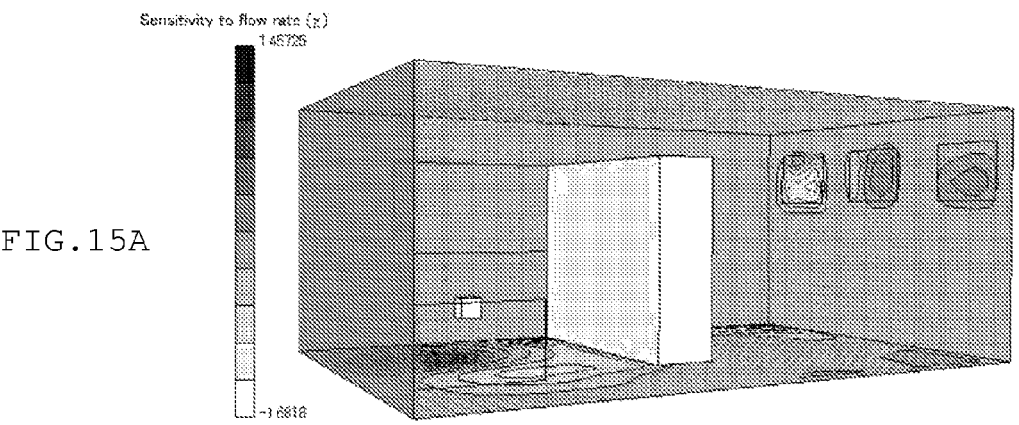
FIGS. 15A and 15B are examples of image display representing sensitivity to the air flow in a Z direction.
Figure 15B:
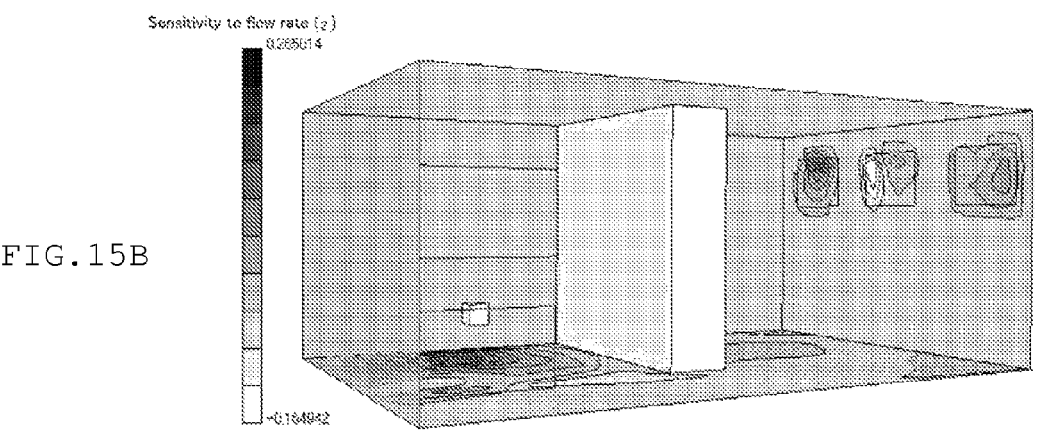
Figure 16A:
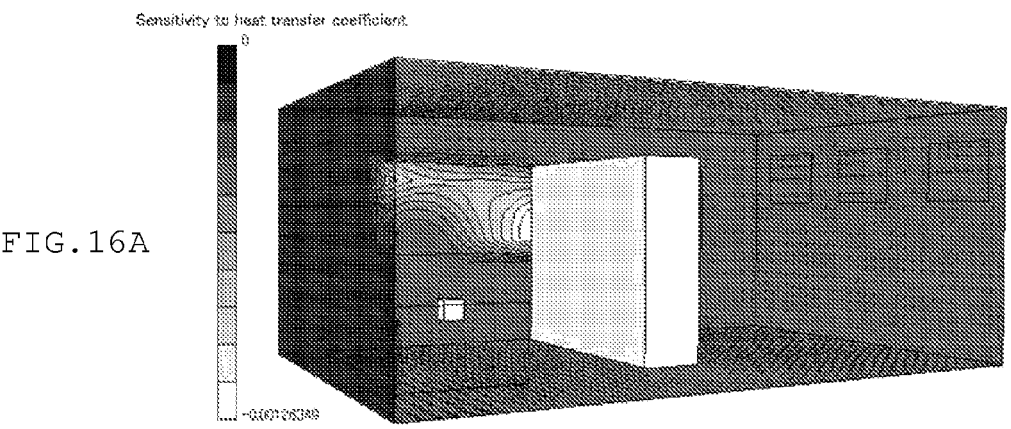
FIGS. 16A and 16B are examples of image display representing sensitivity to an overall heat transfer coefficient.
Figure 16B:
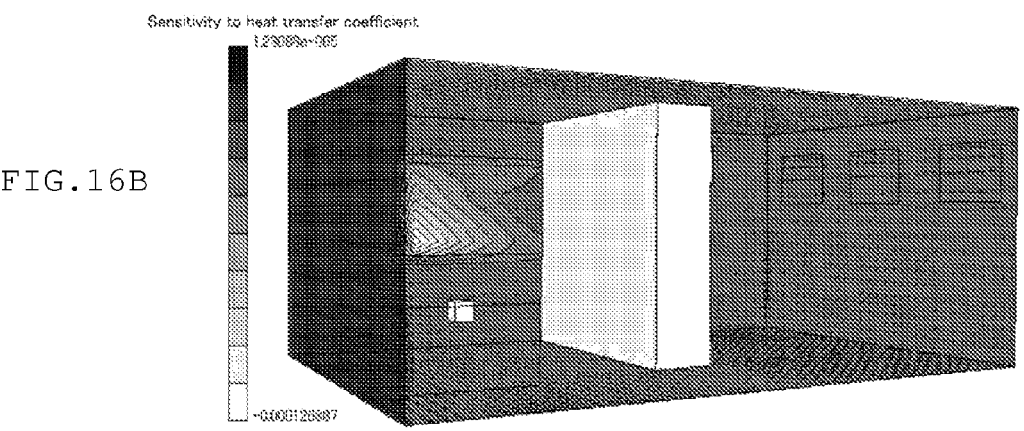

From these results, it is understood that the sensitivity to each parameter varies depending on the height of the partition 60. For example, the following is understood. Where the partition 60 (hereinafter, regarding the reference numerals, see FIGS. 11A and 11B) does not reach the ceiling as shown in FIG. 12A, the sensitivity to the temperature at the left blowoff outlet 51 is high. Where the partition 60 reaches the ceiling as shown in FIG. 12B, the sensitivity to the temperature at the left blowoff outlet 51 is low, and the sensitivity to the temperature at the right blowoff outlet 53 is highest. Accordingly, in order to raise the temperature of the target 25, it is preferable to set the temperature at the left blowoff outlet 51 high where the partition 60 does not reach the ceiling, and to set the temperature at the right blowoff outlet 53 high where the partition 60 reaches the ceiling.

As described above, the design support method and the design support system 1 according to this preferred embodiment can significantly reduce the number of times of numerical simulation required to examine the designing parameters for achieving the design purpose, thus can significantly reduce the load on the computer, and also can significantly reduce the time for the calculation, as compared with the usual design method which is a combination of the numerical simulation (forward analysis) and the optimization algorithm.

According to the design support method and the design support system 1 in this preferred embodiment, the design purpose is first set and then inverse analysis is performed to find the sensitivity to each of various parameters. Then, the information on the sensitivity is graphically displayed on the display device 12. Therefore, when designing a heat convection field, a guide regarding which parameter(s), and how much of the parameter(s), should be changed can be easily obtained. For example, in the case where the temperature at a predetermined point in the indoor space is to be put to a predetermined level, a specific design guide can be obtained regarding at which blowoff outlet(s), and how much, the temperature should be raised. Thus, a clear design guide can be obtained without relying on the intuition of the designer, unlike in the conventional art.

Especially in this preferred embodiment, the information on the sensitivity is displayed on a three-dimensional model visually and quantitatively. Therefore, the guide for design can be obtained easily and quickly. Specifically, the information on the sensitivity is displayed using color gradation levels, contour lines, different colors, or the like. Therefore, the quantitative information on the sensitivity in a three-dimensional space can be grasped at a glance. The design guide can be intuitively perceived. This can realize a highly convenient design support.

According to this preferred embodiment, a designing space model can be created while referring to a three-dimensional graphic image displayed on the display device 12. This allows the designing space model to be created simply and quickly at the site of design. The ability of automatically generating meshes on the model provides a high level of convenience. Also according to this preferred embodiment, the creation of the model, generation of meshes, forward analysis, setting of a design purpose, inverse analysis and display of sensitivity as a result of the inverse analysis can be executed with only a series of simple operations using the input device 10. Namely, the design support system 1 in this preferred embodiment has a modeler function, a forward analysis function, a purpose setting function, an inverse analysis function and a sensitivity display function. Thus, the design support system 1 exhibits superb convenience at the site of design.

In the above-described preferred embodiments, the design purpose is to maximize the temperature at a predetermined point in an indoor space. Alternatively, the design purpose may be something else, for example, to minimize the temperature at a predetermined point in an indoor space. Or, the design purpose may be to maximize or minimize the flow rate, the mass concentration, or the pressure at a predetermined point in an indoor space. Still alternatively, the design purpose may be to maximize or minimize the temperature, mass concentration, flow rate or pressure in a predetermined area of a designing space. Still alternatively, the design purpose may be to maximize or minimize the temperature, heat transfer amount, mass concentration, mass transfer amount, flow rate or pressure at a predetermined point or in a predetermined area on a boundary of a designing space (for example, a wall, a window, etc. which divides the indoor space, window, etc.).

The design purpose may be to make the temperature in a predetermined area in an indoor space uniform. For example, from the viewpoint of the indoor air conditioning environment, it may be occasionally desired to have a uniform temperature in an area where there is always somebody present (for example, around the desk in a work office). In such a case, the indoor environment is designed to maintain a uniform temperature in a predetermined area, not to maximize or minimize the temperature at a predetermined point. The design support system 1 in this preferred embodiment can support such a design of heat convection field by setting a target area and the temperature so as to provide a uniform temperature in a predetermined area.

As described above, the design purpose may be to provide a uniform temperature, mass concentration, flow rate or pressure in a predetermined area in a designing space. Alternatively, the design purpose may be to provide a uniform temperature, heat transfer amount, mass concentration, mass transfer amount, flow rate or pressure in a predetermined area on a boundary of a designing space.

The design purpose may be to put the temperature at a plurality of points in an indoor space to a respective predetermined level. For example, from the viewpoint of an air conditioning environment of a work office in winter, it may be occasionally desired to make an area where there is always somebody present warm, but to make an area where there are office electronics relatively cool. In such a case, the design support system 1 can set a plurality of targets and set an appropriate temperature to be achieved for each of the targets. The design support system 1 can also support a design of heat convection field in such a case.

As described above, the design purpose may be to put the temperature, mass concentration, flow rate or pressure at one or each of a plurality of points or in one or each of a plurality of areas in a designing space to a predetermined level. Alternatively, the design purpose may be to put the temperature, heat transfer amount, mass concentration, mass transfer amount, flow rate or pressure at one or each of a plurality of points or in one or each of a plurality of areas on a boundary of a designing space to a predetermined level.

Alternatively, the temperature at a plurality of points in an indoor space may be actually measured in advance, and the design purpose may be to put the temperature of each of the points to the actually measured value. In this way, the design support system 1 may be used to identify an unknown designing parameter. In this case, the amount of heat leaking from the wall can be analyzed, and thus a design of heat insulation conditions of the wall (design of specifications of a heat insulator) or the like can be supported.

As described above, the design purpose may be to put the temperature, mass concentration, flow rate or pressure at one or each of a plurality of points or in one or each of a plurality of areas in a designing space to the actually measured value of the temperature, mass concentration, flow rate or pressure at the respective point or area. Alternatively, the design purpose may be to put the temperature, heat transfer amount, mass concentration, mass transfer amount, flow rate or pressure at one or each of a plurality of points or one or each of a plurality of areas on a boundary of a designing space to the actually measured value of the temperature, heat transfer amount, mass concentration, mass transfer amount, flow rate or pressure at the respective point or area.

The design support method described above is completed when the sensitivity is displayed after inverse analysis (as shown in FIG. 2). Alternatively, optimization may be performed by, after the inverse analysis, automatically changing the designing variable based on mathematical programming (gradient-type nonlinear optimization) and repeating forward analysis and inverse analysis. Namely, the design support system 1 may include an optimization function of automatically optimizing a designing parameter for the design purpose.

Figure 18:
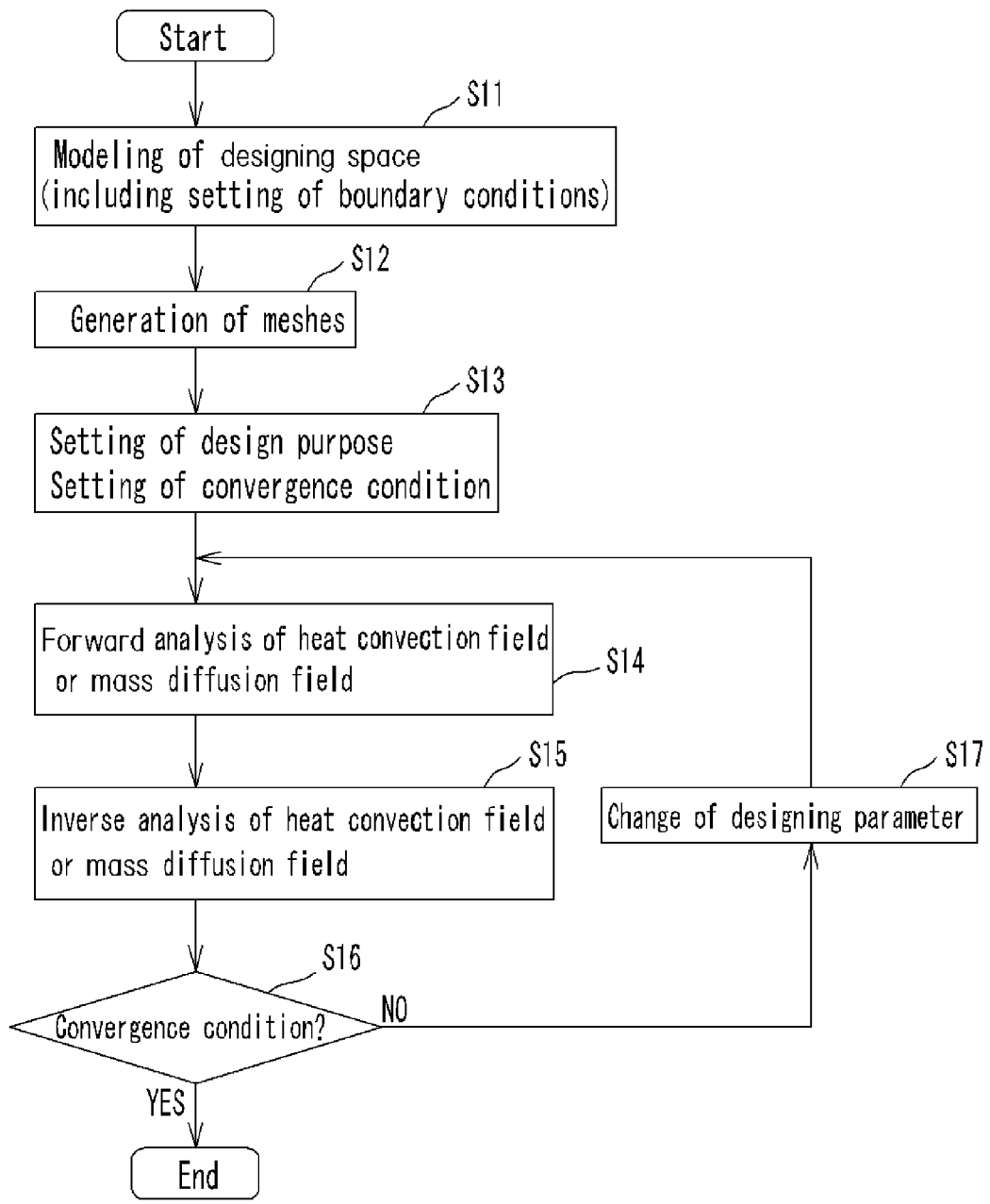
FIG. 18 is a flowchart of an automatic optimization design of an indoor environment.

For example, as shown in FIG. 18, the designing space is modeled in step S11, and then meshes are automatically generated in step S12. Then, in step S13, the design purpose and a convergence condition are set. After performing forward analysis in step S14, inverse analysis is performed in step S15. Then, in step S16, it is determined whether the convergence condition has been fulfilled or not. When the convergence condition has not been fulfilled, the value of the designing parameter is changed in step S17, and the forward analysis in step S14 and the inverse analysis in step S15 are repeated. The forward analysis and the inverse analysis are repeated until the convergence condition is fulfilled in step S16. For such an optimization calculation, it is preferable that the user sets the upper limit and the lower limit so that the repeated calculation does not diverge.

In the above-described preferred embodiments, the sensitivity found by the inverse analysis is displayed on the screen as it is. Instead of the sensitivity, a change amount of the designing parameter which is necessary for the required change of the design purpose may be displayed. For example, referring to the above-described specific example, instead of the sensitivity to the temperature at the blowoff outlet, a change amount of the temperature at the blowoff outlet (for example, the amount of temperature which needs to be changed in order to raise the temperature of the target by 1° C.) may be displayed. In this way, the designer can perform the design more easily.

In the above-described preferred embodiments, the designing parameter is the temperature on a boundary of an indoor space or the like. According to preferred embodiments of the present invention, the designing parameter is not limited to a so-called boundary condition but encompasses the internal heat generation, internal mass diffusion, the shape of the physical object and the like in a designing space or the like.

The above-described preferred embodiments are applied to air conditioning design in an indoor space. The present invention is not limited to air conditioning design, but it could be applicable to design any heat convection field or mass diffusion field. The preferred embodiments of the present invention are not limited to indoor or outdoor air conditioning design, but is applicable to, for example, internal thermal design of the housing of electronics such as computers and the like, internal environmental design of plants and factories, estimate of the influence of exhaust gas on parking areas, estimate of behavior of the thermal fluid in a heat storage tank, and the like.

As described above, the present invention is useful for, for example, designing various devices or various spaces (environment) using heat or mass transfer.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A design support method for a heat convection field or a mass diffusion field, comprising:
    a modeling support step of modeling a designing space upon receipt of a signal from an input device operated by a user while displaying a predetermined image on a display device arranged to display a graphic image;
    a mesh generation step of generating a mesh on the designing space model;
    a forward analysis step of analyzing either a heat convection field or a mass diffusion field of the designing space model by solving an equation of the heat convection field or the mass diffusion field based on an initially set value of a designing parameter input through the input device regarding the meshed designing space model;
    a purpose setting step of setting a design purpose upon receipt of a signal from the input device while displaying a predetermined image on the display device;

an inverse analysis step of analyzing a sensitivity defined by a change ratio of the design purpose with respect to a change in the designing parameter by solving an adjoint equation in correspondence with the design purpose based on the set design purpose; and a sensitivity display step of displaying information on the sensitivity analyzed by the inverse analysis as a graphic image on the display device; wherein the inverse analysis step includes the steps of:

setting an objective function J defined as the following equation (1) as the design purpose;

solving a following adjoint equation (3) in correspondence with the design purpose under the following boundary condition (4) and constraints defined as a following equation (2); and using a sensitivity represented by a following equation (5) obtained by the adjoint equation (3)

$$J = \int_\Omega f_T d\Omega + \int_\Omega f_C d\Omega + \int_\Omega f_u d\Omega + \int_\Omega f_p d\Omega + \quad (1)$$
$$\int_{\Gamma_T} g_T d\Gamma + \int_{\Gamma_q} g_q d\Gamma + \int_{\Gamma_C} g_C d\Gamma + \int_{\Gamma_m} g_m d\Gamma + \int_{\Gamma_u} g_u d\Gamma$$

$$L = J + \int_\Omega [p^*, u^*, T^*, C^*] A(p, u, T, C) d\Omega \quad (2)$$

$$A^*[p^*, u^*T^*, C^*]^T = \left[\frac{\partial f_p}{\partial p}, \frac{\partial f_u}{\partial u}, \frac{\partial f_T}{\partial T}, \frac{\partial f_C}{\partial C}\right]^T \quad T^* = -\frac{\partial g_T}{\partial q} \text{ on } \Gamma_T, \quad (3)$$
$$q^* = -\frac{\partial g_q}{\partial T} \text{ on } \Gamma_q, \quad q^* = KT^* \text{ on } \Gamma_K$$

$$C^* = -\frac{\partial g_C}{\partial m} \text{ on } \Gamma_C, \quad m^* = -\frac{\partial g_m}{\partial C} \text{ on } \Gamma_m, \quad u^* = -\frac{\partial g_u}{\partial \sigma} \text{ on } \Gamma_u \quad (4)$$

$$\delta J = \int_{\Gamma_q} T^* \delta q d\Gamma + \int_{\Gamma_T} q^* \delta T d\Gamma + \int_{\Gamma_K} (T_{outside} - T) T^* \delta d K d \Gamma \quad (5)$$

where $f_T$, $f_C$, $f_u$, and $f_p$: Functions regarding temperature mass concentration, flow rate, and pressure defined in a space Q;

$\Gamma_T$, $\Gamma_q$, $\Gamma_C$, $\Gamma_m$, and $\Gamma_u$: Boundaries of the space Q in which the temperature heat flux concentration, diffusion flux, and flow rate vector are controllable;

$g_T$, $g_q$, $g_C$, $g_m$, and $g_u$: Functions regarding temperature, heat flux, concentration, diffusion flux, and flow rate vector defined on the respective boundaries of the space Q;

A: A vector formed of governing equations of the field having the pressure p, the flow rate vector u, the temperature T and the concentration C as the dependent variables;

p*, u*, T*, and C*: Adjoint pressure, adjoint flow rate, adjoint temperature, and adjoint concentration;

A*: An adjoint operator matrix to a linear perturbation equation system; and

δq, δT, δK, δm, δC, and δu: Influences of a heat flux change, a temperature change, an overall heat transfer coefficient change, a diffusion flux change, a concentration change, and a flow rate vector change on the boundary.

2. A design support method for a heat convection field or a mass diffusion field according to claim 1, wherein the design purpose is:

to maximize or minimize a predetermined objective function, regarding one of the temperature, the mass concentration, the flow rate, or the pressure, which is defined in a designing space; or to maximize or minimize a predetermined objective function, regarding the temperature, a heat transfer amount, the mass concentration, a mass transfer amount, the flow rate, or the pressure, which is defined on a boundary of a designing space.

3. A design support method for a heat convection field or a mass diffusion field according to claim 1, wherein the design purpose is:

to maximize or minimize one of the temperature, the mass concentration, the flow rate, or the pressure at a predetermined point, or in a predetermined area in a designing space; or to maximize or minimize one of the temperature, a heat transfer amount, the mass concentration, a mass transfer amount, the flow rate, or the pressure at a predetermined point, or in a predetermined area on a boundary of a designing space.

4. A design support method for a heat convection field or a mass diffusion field according to claim 1, wherein the design purpose is:

to achieve one of a uniform temperature, mass concentration, flow rate, or pressure in a predetermined area in a designing space; or to achieve one of a uniform temperature, heat transfer amount, mass concentration, mass transfer amount, flow rate, or pressure in a predetermined area on a boundary of a designing space.

5. A design support method for a heat convection field or a mass diffusion field according to claim 1, wherein the design purpose is:

to put one of the temperature, mass concentration, flow rate, or pressure at one or each of a plurality of points or in one or each of a plurality of areas in a designing space to a predetermined value; or to put one of the temperature, heat transfer amount, mass concentration, mass transfer amount, flow rate, or pressure at one or each of a plurality of points or in one or each of a plurality of areas on a boundary of a designing space to a predetermined value.

6. A design support method for a heat convection field or a mass diffusion field according to claim 1, wherein the design purpose is:

to put one of the temperature, mass concentration, flow rate, or pressure at one or each of a plurality of points or in one or each of a plurality of areas in a designing space to a value of the temperature, mass concentration, flow rate, or pressure actually measured in advance at the respective point or area; or to put one of the temperature, heat transfer amount, mass concentration, mass transfer amount, flow rate, or pressure at one or each of a plurality of points or in one or each of a plurality of areas on a boundary of a designing space to a value of the temperature, heat transfer amount, mass concentration, mass transfer amount, flow rate, or pressure actually measured in advance at the respective point or area; and the method further comprising identifying a value of an unknown designing parameter from the actually measured value.

7. A design support method for a heat convection field or a mass diffusion field according to claim 1, wherein the sensitivity display step includes a step of displaying a graphic image of the designing space model provided with one of a color, a color gradation level, or a contour line in accordance with the level of sensitivity.

8. A design support method for a heat convection field or a mass diffusion field according to claim 1, wherein the sensitivity display step includes a step of displaying a change ratio of the design purpose with respect to a change in the designing parameter in an area within a predetermined boundary designated through the input device.

9. A design support method for a heat convection field or a mass diffusion field according to claim 1, wherein in the sensitivity display step, a change amount of the designing parameter which is necessary for a required change of the design purpose is displayed instead of the sensitivity.

10. A design support method for a heat convection field or a mass diffusion field according to claim 1, further comprising:
instead of the sensitivity display step, an automatic optimization step of, after the inverse analysis step, changing a value of the designing parameter in accordance with mathematical programming based on the sensitivity analyzed in the inverse analysis, and repeating the forward analysis step and the inverse analysis step to optimize the designing parameter for the design purpose.

11. A design support system for a heat convection field or a mass diffusion field, comprising a computer input device operable by a user, a computer, and a computer display device for displaying a graphic image for the user, wherein the computer comprises:
a modeling support device modeling a designing space upon receipt of a signal from the computer input device while displaying a predetermined image on the computer display device;
a mesh generation device generating a mesh on the designing space model;
a forward analysis device analyzing the heat convection field or the mass diffusion field of the designing space model by solving an equation of the heat convection field or the mass diffusion field based on an initially set value of a designing parameter input through the computer input device regarding the meshed designing space model;
a purpose setting device setting a design purpose upon receipt of a signal from the computer input device while displaying a predetermined image on the computer display device;
an inverse analysis device analyzing a sensitivity defined by a change ratio of the design purpose with respect to a change in the designing parameter by solving an adjoint equation in correspondence with the design purpose based on the set design purpose; and
a sensitivity display device displaying information on the sensitivity analyzed by the inverse analysis as a graphic image on the computer display device; wherein
the inverse analysis device includes:
a setting unit arranged to set an objective function J defined as a following equation (1) as the design purpose;
a solving unit arranged to solve a following adjoint equation (3) in correspondence with the design purpose under a following boundary condition (4) and constraints defined as a following equation (2); and
an analyzing unit arranged to use a sensitivity represented by a following equation (5) obtained by the adjoin equation (3)

$$J = \int_\Omega f_T \, d\Omega + \int_\Omega f_C \, d\Omega + \int_\Omega f_u \, d\Omega + \int_\Omega f_p \, d\Omega + \quad (1)$$
$$\int_{\Gamma_T} g_T \, d\Gamma + \int_{\Gamma_q} g_q \, d\Gamma + \int_{\Gamma_C} g_C \, d\Gamma + \int_{\Gamma_m} g_m \, d\Gamma + \int_{\Gamma_m} g_u \, d\Gamma$$

$$L = J + \int_\Omega [p^*, u^*, T^*, C^*] A(p, u, T, C) d\Omega \quad (2)$$

$$A^*[p^*, u^*T^*, C^*]^T = \left[\frac{\partial f_p}{\partial p}, \frac{\partial f_u}{\partial u}, \frac{\partial f_T}{\partial T}, \frac{\partial f_C}{\partial C}\right]^T \quad T^* = -\frac{\partial g_T}{\partial q} \text{ on } \Gamma_T, \quad (3)$$
$$q^* = -\frac{\partial g_q}{\partial T} \text{ on } \Gamma_q, \quad q^* = KT^* \text{ on } \Gamma_K$$

$$C^* = -\frac{\partial g_C}{\partial m} \text{ on } \Gamma_C, \quad m^* = -\frac{\partial g_m}{\partial C} \text{ on } \Gamma_m, \quad u^* = -\frac{\partial g_u}{\partial \sigma} \text{ on } \Gamma_u \quad (4)$$

$$\delta J = \int_{\Gamma_q} T^* \delta q \, d\Gamma + \int_{\Gamma_T} q^* \delta T \, d\Gamma + \int_{\Gamma_K} (T_{outside} - T) T^* \delta K d \, \Gamma \quad (5)$$

where $f_T$, $f_C$, $f_u$, and $f_p$: Functions regarding temperature mass concentration flow rate and pressure defined in a space Q;
$\Gamma_T$, $\Gamma_q$, $\Gamma_C$, $\Gamma_m$, and $\Gamma_u$: Boundaries of the space Q in which the temperature heat flux concentration, diffusion flux, and flow rate vector are controllable;
$g_T$, $g_q$, $g_C$, $g_m$, and $g_u$: Functions regarding temperature, heat flux, concentration, diffusion flux, and flow rate vector defined on the respective boundaries of the space Q;
A : A vector formed of governing equations of the field having the pressure p, the flow rate vector u, the temperature T and the concentration C as the dependent variables;
p*, u*, T*, and C*: Adjoint pressure, adjoint flow rate, adjoint temperature, and adjoint concentration;
A* : An adjoint operator matrix to a linear perturbation equation system; and
δq, δT, δK, δm, δC, and δu: Influences of a heat flux change, a temperature change, an overall heat transfer coefficient change, a diffusion flux change, a concentration change, and a flow rate vector change on the boundary.

* * * * *

UNITED STATES PATENT AND TRADEMARK OFFICE
CERTIFICATE OF CORRECTION

PATENT NO. : 8,073,662 B2
APPLICATION NO. : 12/295894
DATED : December 6, 2011
INVENTOR(S) : Kazunari Momose et al.

It is certified that error appears in the above-identified patent and that said Letters Patent is hereby corrected as shown below:

On the Title Page, please replace Item (73) with the following corrected information:

Item (73) Assignees: Osaka University, Osaka (JP)

Advanced Knowledge Laboratory Co., Ltd., Tokyo (JP)

Signed and Sealed this
Seventh Day of August, 2012

David J. Kappos
*Director of the United States Patent and Trademark Office*